(12) United States Patent
Suzuki et al.

(10) Patent No.: US 8,864,044 B2
(45) Date of Patent: Oct. 21, 2014

(54) CARBON DIOXIDE COATING METHOD AND DEVICE THEREFOR

(75) Inventors: Akira Suzuki, Sendai (JP); Shin-ichiro Kawasaki, Sendai (JP); Noriaki Hayasaka, Miyagi (JP)

(73) Assignees: National Institute of Advanced Industrial Science and Technology, Tokyo (JP); Kami Electronic Industry Co., Ltd., Kami-gun (JP)

( * ) Notice: Subject to any disclaimer, the term of this patent is extended or adjusted under 35 U.S.C. 154(b) by 523 days.

(21) Appl. No.: 13/258,972

(22) PCT Filed: Mar. 30, 2010

(86) PCT No.: PCT/JP2010/002336
§ 371 (c)(1),
(2), (4) Date: Nov. 21, 2011

(87) PCT Pub. No.: WO2010/113489
PCT Pub. Date: Oct. 7, 2010

(65) Prior Publication Data
US 2012/0097751 A1 Apr. 26, 2012

(30) Foreign Application Priority Data

Mar. 31, 2009 (JP) .................................. 2009-088479
Mar. 31, 2009 (JP) .................................. 2009-088501

(51) Int. Cl.
*B05B 1/24* (2006.01)
*B05B 9/00* (2006.01)
(Continued)

(52) U.S. Cl.
CPC ............. *B01F 5/0256* (2013.01); *B05B 7/0483* (2013.01); *C09D 7/001* (2013.01); *B01F 3/04049* (2013.01); *B01F 5/0077* (2013.01)

USPC ............. 239/13; 239/124; 239/127; 239/128; 239/304; 239/310

(58) Field of Classification Search
USPC ............... 239/8, 13, 124, 127, 128, 135, 139, 239/303, 304, 310, 407, 417.5, DIG. 14
See application file for complete search history.

(56) References Cited

U.S. PATENT DOCUMENTS 4,506,682 A 3/1985 Muller
5,009,367 A * 4/1991 Nielsen .............................. 239/3
(Continued)

FOREIGN PATENT DOCUMENTS

EP 0 321 607 A2 6/1989
EP 0 321 607 A3 6/1989
(Continued)

OTHER PUBLICATIONS

International Search Report Issued Jun. 29, 2010 in PCT/JP10/002336 filed Mar. 30, 2010.

(Continued)

*Primary Examiner* — Ryan Reis
(74) *Attorney, Agent, or Firm* — Oblon, Spivak, McClelland, Maier & Neustadt, L.L.P.

(57) ABSTRACT

The present invention provides a low environmental burden type coating method using carbon dioxide and a coating device therefor that carry out carbon dioxide coating in which carbon dioxide is substituted for all or a portion of a diluent solvent (thinner) used in organic solvent-based spray coating, the coating method being configured to prevent deposition of a polymer of a paint component that has entered as a result of backflow by preliminarily adding, to carbon dioxide, a true solvent component of the paint in at least an amount required for saturated solubility (20% to 50% per weight of carbon dioxide) to lower the dissolving power of carbon dioxide with respect to the true solvent component. According to the present invention, it is possible to provide a coating method and a device therefor capable of considerably reducing VOC generation, and a coating method and a device therefor capable of performing stable carbon dioxide coating of a one-liquid curing type or two-liquid curing type paint.

30 Claims, 14 Drawing Sheets

(51) Int. Cl.
*B05B 7/26* (2006.01)
*A62C 13/62* (2006.01)
*B01F 5/02* (2006.01)
*B05B 7/04* (2006.01)
*C09D 7/00* (2006.01)
*B01F 3/04* (2006.01)
*B01F 5/00* (2006.01)

(56) References Cited

U.S. PATENT DOCUMENTS

| | | | | |
|---|---|---|---|---|
| 5,171,613 A | * | 12/1992 | Bok et al. | 427/422 |
| 5,197,800 A | * | 3/1993 | Saidman et al. | 366/136 |
| 5,203,843 A | * | 4/1993 | Hoy et al. | 239/135 |
| 5,211,342 A | * | 5/1993 | Hoy et al. | 239/707 |
| 5,443,796 A | * | 8/1995 | Coeling et al. | 422/129 |

FOREIGN PATENT DOCUMENTS

| | | |
|---|---|---|
| EP | 0420181 A2 | 4/1991 |
| EP | 0 595 521 A1 | 5/1994 |
| EP | 0605137 A1 | 7/1994 |
| JP | 58 107165 | 6/1983 |
| JP | 1-258770 | 10/1989 |
| JP | 3-504689 | 10/1991 |
| JP | 06 057336 | 8/1994 |
| JP | 6-218318 | 8/1994 |
| JP | 6-228473 | 8/1994 |
| JP | 06 228473 | 8/1994 |
| JP | 7-96154 | 4/1995 |
| JP | 1927328 C | 4/1995 |
| JP | 08 038979 | 2/1996 |
| JP | 2670904 B2 | 10/1997 |
| JP | 2739548 B2 | 4/1998 |
| JP | 2785099 B2 | 8/1998 |
| JP | 2807927 B2 | 10/1998 |
| JP | 2004-833 | 1/2004 |
| JP | 2004 000833 | 1/2004 |
| JP | 2008-12453 | 1/2008 |
| JP | 2008 012453 | 1/2008 |
| WO | WO 90/11139 A1 | 10/1990 |
| WO | WO 90/11333 A1 | 10/1990 |
| WO | WO 96/14144 A1 | 5/1996 |

OTHER PUBLICATIONS

Search Report issued Feb. 17, 2014, in EP Application No. 10758269.4-1353/2415529.

Supplemental Search Report issued Mar. 6, 2014, in EP Application No. 10758269.4-1353/2415529.

* cited by examiner

PROPOSED COATING DEVICE FLOW

1 PAINT TANK
2 FILTER
3 PAINT HIGH-PRESSURE VALVE
4 BACK PRESSURE VALVE
5 PAINT HEATER
6 CO2 CYLINDER
7 FILTER
8 COOLER
9 CO2 HIGH-PRESSURE PUMP
10 CO2 HEATER
11 BACK PRESSURE VALVE
12 COOLER
13 CHECK VALVE
14 CHECK VALVE
15 MIXER
16 MIXTURE HEATER
17 STOP VALVE
18 STOP VALVE
19 SPRAY GUN

FLOW OF SOLUBILITY MEASUREMENT SYSTEM

1  PAINT TANK
2  FILTER
3  PAINT HIGH-PRESSURE PUMP
5  PAINT HEATER
6  CO2 CYLINDER
7  FILTER
8  COOLER
9  CO2 HIGH-PRESSURE PUMP
10 CO2 HEATER
13 CHECK VALVE
14 CHECK VALVE
15 MIXER
16 MIXTURE HEATER
20 PRESSURE-PROOF OBSERVATION WINDOW
21 BACK PRESSURE VALVE

ONE-LIQUID CURING TYPE COLORED PAINT    TWO-LIQUID CURING TYPE COLORED PAINT

| | |
|---|---|
| 1 PAINT TANK | 11 BACK PRESSURE VALVE |
| 2 FILTER | 12 COOLER |
| 3 PAINT HIGH-PRESSURE PUMP | 13 CHECK VALVE |
| 4 BACK PRESSURE VALVE | 14 CHECK VALVE |
| 5 PAINT HEATER | 15 MIXER |
| 6 CO2 CYLINDER | 16 MIXTURE HEATER |
| 7 FILTER | 17 STOP VALVE |
| 8 COOLER | 18 STOP VALVE |
| 9 CO2 HIGH-PRESSURE PUMP | 19 SPRAY GUN |
| 10 CO2 HEATER | 30 SOLVENT TANK |
| | 31 SOLVENT HIGH-PRESSURE PUMP |

PHOTO 1: CASE OF CO2 ONLY IN EXAMPLE 2

DEPICTION OF INSIDE OF CHECK VALVE    DEPICTION OF INSIDE OF FILTER

CARBON DIOXIDE COATING METHOD AND DEVICE THEREFOR

TECHNICAL FIELD

The present invention relates to a carbon dioxide coating method and a device therefor, and more particularly, to a coating method and a device therefor capable of considerably reducing generation of volatile organic compounds (VOC) while ensuring coating finish quality, with respect to coated film uniformity, smoothness, image clarity and the like, equivalent to that of organic solvent-based coating, by substituting a minimal amount of carbon dioxide for the diluent solvent (VOC) used in large amounts in conventional spray coating with an organic solvent-based coating material. The present invention provides a novel coating technology relating to a low environmental burden type coating method and a device therefor that enable the generation of VOC into the atmosphere to be considerably reduced, and relating to a low environmental burden type coating method and a device therefor that enable stable carbon dioxide coating of a one-liquid curing type coating material or two-liquid curing type coating material.

BACKGROUND ART

Generation of VOC was required to be reduced by 30%, including voluntary controls, in 2010 as a result of having been designated as a harmful chemical substance that leads to global warming. In the field of paints, since large amounts of organic solvents are used as viscosity lowering agents used in paints, and the paint industry is the largest generation source of VOC, accounting for nearly 60% of the total of roughly 1,500,000 tons of VOC generated in Japan, the implementation of VOC countermeasures is becoming an opportune issue for the paint industry.

In the area of coating industrial technology, the main form of coating consists of spray coating using a diluent solvent, and various measures have been devised to reduce VOC levels. For example, technologies have been developed for changing over to aqueous paints, using paints, namely high-solid paints, that have reduced levels of organic solvents, or recovering and decomposing discharged organic solvents.

However, among these countermeasure technologies, the present circumstances are such that changing over to aqueous paint requires additional equipment such as a water treatment system and air-conditioning equipment, and although aqueous paint is suitable in the case the object to be coated is a metal material, it is unable to accommodate coating onto plastic components and the like requiring high coating finish quality.

Thus, in the paint industry, and particularly at small- and medium-sized firms, attempting to accommodate the above-mentioned VOC countermeasures presents problems such as requiring considerable equipment investment with the current level of technology, and as a result, there is a strong need for the development of a novel coating technology that is able to take the place of current organic solvent coating or aqueous coating.

On the other hand, with respect to coating technology, a technology has been proposed in a patent filed by the Union Carbide Corp. of the U.S. (Patent Document 1) that uses a supercritical fluid instead of an organic solvent as a viscosity reducing agent (diluent). In this technology, a supercritical fluid, and particularly carbon dioxide, is dissolved in a paint (consisting of a polymer and a true solvent that dissolves the polymer and imparts fluidity) and enables coating by lowering viscosity to a level that enables spraying.

This firm has subsequently filed more than ten patents relating to coating technology, five of which have been registered as patents, including a method for controlling spray width (Patent Document 2), limitation of paint composition (Patent Document 3), a method for improving sprayed state (Patent Document 4), a method for avoiding blockage (Patent Document 5), and a method for controlling density of a paint/$CO_2$ mixture (Patent Document 6).

However, these patents only indicate a single process flow, while the construction of a practical process flow and specific operating methods have had problems in terms of lacking an adequate degree of completeness. Namely, spray coating technologies that use carbon dioxide as a viscosity lowering agent have essentially yet to be established from the viewpoint of being practical industrial technologies.

The process flow indicated in the above-mentioned patents is shown in FIG. 1. In this flow, paint and $CO_2$ are compressed with a pneumatic piston pump, and the paint is heated and sent to a mixer for the purpose of lowering viscosity. The $CO_2$ is sent directly to the mixer in a liquid state without being heated. The paint and $CO_2$ supplied at that time are supplied at a constant volume ratio by a mechanism that simultaneously controls the movement of the pistons of both pumps.

The mixer is a fluid multi-stage separation-type static mixer, and after the mixture is heated, it is passed through a filter, is again mixed by a static mixer, and is sent to a spray gun after reducing in pressure as necessary. In the spray gun, the mixture is sprayed at a flow rate determined according to the pressure. Surplus mixture is pressurized in a circulation line after which it is returned to the line beyond the first static mixer.

Although the above describes the general process flow of carbon dioxide coating proposed in the prior art, when attempting to make this flow practical, there is presumed to be the problem of being unable to achieve a balance between the supplied amounts of paint/$CO_2$ and spray volume, resulting in the risk of, for example, an increase in pump discharge pressure. In this patent, although a configuration is employed that causes paint and $CO_2$ to be released into the atmosphere if pump discharge pressure becomes equal to or greater than a fixed pressure, the release thereof into the atmosphere is not preferable in terms of operation, and is also economically disadvantageous since the paint and $CO_2$, and especially $CO_2$, cannot be reused.

In addition, although a circulation line is provided, this is not particularly required in terms of operation. Moreover, although an electrical heating method is used to heat the paint and mixture, in the case of employing this method, since it is difficult to control the temperature to a constant temperature when starting operation of the device and when changing the flow rate, the use of another type of heating method is desired. In addition, during actual coating work, spraying is frequently momentarily interrupted or stopped for a fixed period of time such as when changing the coated surface or when changing the object to be coated per se.

In such cases, in the proposed process flow, since problems such as increases in system pressure are presumed to occur, considerable improvements are required in order to achieve a realistically feasible process flow. Moreover, there are no considerations given whatsoever to cleaning the lines at completion of coating, which is considered to be important in the case of actual coating. In this manner, the carbon dioxide coating indicated in the above-mentioned series of patents clearly does not constitute a practical process flow configuration constructed at a level that can be applied as an actual coating technology, and there is a strong desire for the construction of a process flow able to be applied practically in this technical field.

Moreover, among the above-mentioned patents, a method for avoiding blockage as indicated in Patent Document 5 is extremely important in terms of practical application of this coating technology. According to this patent, it is indicated that a dense substance for coating that contains a cellulose-based polymer such as nitrocellulose or cellulose acetate butyrate forms a solid precipitate in the mixer, and if operation is allowed to continue, causes an increase in pressure and ultimately results in blockage that prevents further spraying.

This document indicates that, although an attempt to resolve this problem was made by making changes to equipment, including an examination of fluid dynamics and a reexamination of the type of mixer, even though operation was possible for a short period of time, since long-term, stable operation was not possible, the problem of blockage was resolved not through equipment accommodations, but through procedural accommodations, namely by placing limitations on the operating temperature and pressure.

More specifically, this patent indicates that the compressed fluid used to lower viscosity is air or a supercritical fluid at the time of mixing with paint, and is manipulated at a temperature and pressure so as to have a solubility coefficient of about 0.5 cal/cc to about 4.0 cal/cc, thereby preventing deposition of the solid polymer.

On the basis of this patent, when the inventors of the present invention also carried out carbon dioxide coating of a one-liquid curing type paint (acrylic resin-based paint blended with nitrocellulose), blockage was confirmed to occur in the mixer under numerous temperature and pressure conditions. Moreover, problems in the mixture caused by blocking were confirmed to occur frequently and prevent coating from being carried out even under conditions of about 0.5 cal/cc to about 4.0 cal/cc, such as at a pressure of 8 MPa or less under constant temperature conditions of 40° C.

In this patent, this solid deposition phenomenon is discussed from the viewpoint of phase equilibrium, and solubility coefficient is limited as a condition for preventing polymer deposition. As a result of investigating and studying the circumstances involved in polymer deposition in detail with regard to this solid deposition phenomenon, the inventors of the present invention determined that polymer deposition occurs in a single carbon dioxide line immediately before mixing prior to deposition in the mixer, and that as a result thereof, the supply pressure of the carbon dioxide supply line increases rapidly.

These findings suggest that, as a result of backward flow of a portion of the paint into the carbon dioxide supply line to the mixer and the solvent component in the mixture (true solvent) being extracted and removed into carbon dioxide, namely the liquid carbon dioxide or supercritical carbon dioxide, the polymer component in the paint precipitates thereby causing a phenomenon that causes blockage.

Paint does not inherently flow back into the carbon dioxide line during normal operation. However, if pressure fluctuates (pressure increases) due to the presence of a flowing state downstream from the mixer, although pressure immediately increases since the paint is an incompressible fluid, since carbon dioxide is a compressible fluid, a time difference occurs in the pressure rise, and backflow of the paint into the carbon dioxide line is presumed to occur during that time. Namely, coating technology in which carbon dioxide is used as a viscosity lowering agent for a highly quick-drying paint in the manner of a one-liquid curing type paint is considered to have been yet to be established from the viewpoint of an industrialized technology, and in this technical field, there is a strong desire for the development of a novel technology capable of solving these problems while also being able to be applied practically.

Patent Document 1: Japanese Patent Publication No. 1927328
Patent Document 2: Japanese Patent Publication No. 2061845
Patent Document 3: Japanese Patent Publication No. 2670904
Patent Document 4: Japanese Patent Publication No. 2785099
Patent Document 5: Japanese Patent Publication No. 2739548
Patent Document 6: Japanese Patent Publication No. 2807927

DISCLOSURE OF THE INVENTION

With the foregoing in view, as a result of conducting extensive studies for the purpose of solving the above-mentioned problems associated with carbon dioxide coating, and in particular, constructing a practically applicable process flow and establishing a stable operating procedure, the inventors of the present invention succeeded in constructing a novel process flow by employing a high-pressure micro mixer and establishing a specific, stable operating method, thereby leading to completion of the present invention. An object of the present invention is to provide a novel coating method preferable for low VOC paint imposing a low burden on the environment that uses carbon dioxide as a viscosity lowering agent, and a device therefor.

Moreover, with the foregoing in view, as a result of conducting extensive studies for the purpose of solving the above-mentioned problems associated with carbon dioxide coating, and in particular, developing a coating device that uses carbon dioxide able to be preferably applied to highly quick-drying paint in the manner of one-liquid curing type paint and establishing a stable operating method thereof, the inventors of the present invention succeeded in establishing a stable operating method by improving the equipment used, thereby leading to completion of the present invention. An object of the present invention is to provide a coating method for one-liquid or two-liquid paint able to be preferably applied to low VOC paint imposing a low burden on the environment that considerably reduces the generation of VOC into the atmosphere by using carbon dioxide as a viscosity lowering agent, and a device therefor.

The following provides a detailed explanation of a first aspect of the present invention.

The present invention provides a novel coating method imposing a low burden on the environment that is capable of considerably reducing the generation of VOC while ensuring coating finish quality, namely coated film uniformity, smoothness, image clarity and the like, equivalent to that of organic solvent-based coating by substituting a minimal amount of carbon dioxide for the diluent solvent (VOC) used in large amounts in conventional spray coating with an organic solvent-based coating material, and to a device therefor.

The present invention relates to a spray coating device using carbon dioxide in which carbon dioxide is substituted for all or a portion of a diluent solvent (thinner) used in organic solvent-based spray coating, comprising: a paint supply line constituted by a tank for storing paint, a paint high-pressure pump for pressurizing the paint supplied from the tank to a prescribed pressure, and a paint primary pressure regulation valve for regulating discharge pressure of the paint high-pressure pump and returning a surplus to the paint tank; a carbon dioxide supply line constituted by a tank for storing liquid carbon dioxide, a cooler for cooling the liquid carbon dioxide to a prescribed temperature, a liquid carbon dioxide high-pressure pump for pressurizing the liquid carbon dioxide supplied from the cooler to a prescribed pressure, and a liquid carbon dioxide primary pressure regulation valve for regulating discharge pressure of the liquid carbon dioxide high-pressure pump and returning a surplus to suction of the same pump, and a paint/carbon dioxide mixture line constituted by a mixer for mixing pressurized paint supplied from the paint supply line and pressurized carbon dioxide supplied from the carbon dioxide supply line, and a spray gun for spraying the mixed paint/carbon dioxide pressurized mixture supplied from the mixer onto an object to be coated at atmospheric pressure.

The present invention relates to a method for carrying out coating using carbon dioxide by employing the above-mentioned coating device, comprising: operating the coating device by setting the primary pressure regulation valve on the discharge side of the paint high-pressure pump or $CO_2$ high-pressure pump that controls spraying to a spraying pressure, and setting the primary pressure regulation valve on the discharge side of the paint high-pressure pump or $CO_2$ high-pressure pump that does not control spraying pressure to a pressure higher than the spraying pressure, to make the flow rate of fluid not used to control spraying pressure constant, vary the flow rate of fluid used to control spraying pressure according to flow rate characteristics of a spray nozzle orifice, and return a surplus to pump suction.

In addition, the present invention relates to a method for carrying out coating using carbon dioxide by employing the above-mentioned coating device, comprising: setting the primary pressure regulation valves on the discharge side of the paint high-pressure pump and the carbon dioxide high-pressure pump to a pressure higher than a spraying pressure, spraying the entire amount of fluid discharged from the both pumps, and adjusting the spraying pressure dependent on flow rate characteristics of a nozzle orifice of the spray gun.

In a preferable embodiment of the present invention, the coating device has a paint heater for heating the pressurized paint to a prescribed temperature, a cooler for cooling the surplus carbon dioxide returned to the suction of the liquid carbon dioxide high-pressure pump to a prescribed temperature, a carbon dioxide heater for heating the pressurized liquid carbon dioxide to a prescribed temperature, and a mixture heater for heating the mixed paint/carbon dioxide pressurized mixture to a prescribed temperature, and the mixer is a micro mixer capable of rapidly mixing the paint and carbon dioxide.

In addition, in a preferable embodiment of the present invention, the fluid that controls spraying pressure is the paint, the primary pressure regulation valves of the paint high-pressure pump and the carbon dioxide high-pressure pump are set higher than the spraying pressure, the entire amount of fluid discharged from the both pumps is sprayed, and the spraying pressure is regulated dependent on flow rate characteristics of a nozzle orifice of the spray gun, and a stable single-phase mixture is obtained by setting a residence time from the mixer to the spray gun to be at least 15 seconds.

In general, organic solvent-based coating requires viscosity to be lowered to a viscosity that allows spraying by adding a diluent solvent such as toluene or xylene at 50% to 150% by weight of the paint, namely a polymer and true solvent that imparts fluidity by dissolving the polymer. The paint/diluent solvent mixture for which viscosity has been lowered is coated onto an object to be coated by being atomized as fine droplets by an air spraying method that uses air for the spraying medium or a high-pressure spraying method that does not use atomized air.

The present invention provides a coating method in which carbon dioxide is substituted for all or a portion of a diluent solvent used in the organic solvent-based coating described above. A paint targeted by a first aspect of the present invention can be broadly classified into three types consisting of ultraviolet curing type paint, one-liquid curing type paint and two-liquid curing type paint. Ultraviolet curing type paint refers to paint that is cured and forms a coated film with ultraviolet light, yields a coated film that has high hardness and superior wear resistance, scratch resistance, chemical resistance and solvent resistance, and is used as a hard coating for cell phones and the like.

The above-mentioned paint forms a paint film by using ultraviolet light (UV) as an energy source to cause radical polymerization of acrylic oligomer and monomer components. In addition, a one-liquid curing type paint refers to a paint that is used without diluting or is used by incorporating only a diluent such as thinner (viscosity adjuster), and is mainly used for electrical appliances such as television cabinets or for automobile parts, industrial parts and the like.

The above-mentioned paint consists mainly of an acrylic resin, and forms a paint film without using a curing agent. This paint is quick-drying, has high hardness and has superior wear resistance as a result of being blended with nitrocellulose. Examples of applicable materials include polystyrene resin, ABS resin, AS resin, Noryl resin, unplasticized vinyl chloride resin and polycarbonate resin, and are used in a wide range of applications.

On the other hand, two-liquid curing type paint refers to paint that is mixed with a curing agent prior to use and is cured and dried by a chemical reaction, has superior alcohol resistance and wear resistance, and is mainly used for automobile interiors, precision equipment, optical equipment and the like. This paint is a two-liquid reactive curing type acrylic urethane paint that is mainly composed of an acrylic resin and uses a polyisocyanate compound for the curing agent.

In the present invention, although carbon dioxide is mixed and dissolved in the paint, the conditions thereof consist of a temperature of 30° C. to 70° C. and preferably 35° C. to 45° C., and a pressure of 5 MPa to 20 MPa and preferably 7 MPa to 10 MPa. Thus, although it is necessary to pressurize the paint, since viscosity is high at 50 cp to 500 cp, a piston pump or diaphragm pump is generally used for the paint high-pressure pump.

A gear pump can also be employed if the paint viscosity is sufficiently high. On the other hand, a plunger pump in addition to a piston pump or diaphragm pump can be employed for the carbon dioxide high-pressure pump. However, since it is advantageous to pressurize liquid carbon dioxide when pressuring carbon dioxide, cooling is required in a stage prior to the pump in this case.

Although there are no particular limitations on the type of heater in the present invention, the heater is required to maintain temperature at as constant a level as possible such as when starting operation of the device or when changing the flow rate, and prevent any large changes in the temperature of each fluid such as when temporarily interrupting spraying and resuming spraying when switching the coated surface, for example. Consequently, instead of a commonly used electrical heating type heater, a tank/coil type heat exchanger is used preferably in which a high-pressure line through which a fluid passes is immersed in the shape of a coil in a tank filled with a heating medium (and normally, water).

In the present invention, it is necessary to efficiently mix carbon dioxide and dissolve carbon dioxide in the paint. Although an inline mixer in the form of a static mixer applying the principle of fluid multistage separation has conventionally been used for this purpose, it is not always possible to realize adequate mixing and dissolution with this type of mixer. A high-pressure micro mixer is used in the present invention that utilizes the principle of micro mixing.

Although there are no particular limitations on the type of high-pressure micro mixer, in consideration of the high viscosity of the paint and blockage, a micro mixer that utilizes fluid turbulent mixing effects is preferable to the use of a laminar flow type of micro mixer available from IMM of Germany, for example, that employs an interdigital channel structure for mixing two fluids and has an extremely short diffusion distance.

Examples of these mixers include T-shaped mixers having a flow path diameter of 0.5 mm or less, swirl-type micro mixers that utilize swirl flow, central collision type micro mixers that cause fluid to collide in the center of a minute space, and double tube style micro mixers having an inner tube with inner diameter of 0.5 mm or less.

In addition, by coupling a conventionally used static mixer to a latter stage of these micro mixers, adequate dissolution of carbon dioxide in the paint can be realized, thereby making it possible to form a stable single-phase mixture. Although the paint and carbon dioxide may be present in two phases between the mixer and the spray gun depending on the conditions, in this case, since the viscosities of the two fluids differ considerably, spraying becomes unstable resulting in the risk of being unable to realize attractive coating. Although the solubility of carbon dioxide in the paint varies considerably depending on the type of paint, temperature and pressure, this is also greatly affected by the configuration of the mixer.

According to experimental results obtained from examples to be subsequently described, even if the paint and carbon dioxide are completely mixed by the micro mixer, it was determined that a fixed retention time is required until carbon dioxide completely dissolves in the paint and that this retention time is important.

Although the spray gun used in the present invention is only required to be a high-pressure spray gun of the airless type, since ultimate control of spraying flow rate, spraying pressure and spraying pattern is dependent on the opening diameter (equivalent diameter) and shape thereof of the high-pressure nozzle orifice installed on the spray gun, it is extremely important. Although spraying flow rate varies considerably depending on the setting of the coated amount per unit time, a value is typically selected within the range of 50 g/min to 500 g/min in terms of the paint flow rate.

In the case of a spraying flow rate of 100 g/min, for example, if the pressure at that time is 5 MPa to 10 MPa, a value of 0.1 mm to 0.2 mm is selected for the equivalent diameter of the orifice. Although the shape of the orifice varies according to the desired spraying pattern, in the case of a flat spray, the shape of the orifice is oval. In addition, although a full cone spray results if the shape of the orifice is circular, by controlling the spraying pattern by blowing air immediately after spraying, a full cone spray can be changed to a flat spray.

The following provides a detailed explanation of an embodiment of the present invention with reference to the attached drawings. The device shown in FIG. 2 is an example of a preferable embodiment of the carbon dioxide coating device according to the present invention. Reference symbols in the drawing indicate means indicated below. Namely, reference symbol 1 indicates a paint tank, 2 a paint filter, 3 a paint high-pressure pump, 4 a paint back pressure valve (primary pressure regulation valve), 5 a paint heater, 6 a $CO_2$ cylinder, 7 a $CO_2$ filter, 8 a $CO_2$ cooler, 9 a $CO_2$ high-pressure pump, 10 a $CO_2$ heater, 11 a $CO_2$ back pressure valve (primary pressure regulation valve), 12 a $CO_2$ cooler 2, 13 a paint check valve, 14 a $CO_2$ check valve, 15 a mixer, 16 a mixture heater, 17 a mixture stop valve, 18 a $CO_2$ stop valve and 19 a spray gun.

In providing a detailed explanation of the above-mentioned device and the operation thereof, paint is filled into the paint tank 1, the paint is pressurized (to several atmospheres) with nitrogen gas and the like as necessary, and the paint is supplied to suction of the paint high-pressure pump 3 via the filter 2. Although the aperture size of the filter 2 is normally several tens of micrometers in the case of a clear paint, in the case of colored paint, it is preferably several hundreds of micrometers since the paint contains solid pigment.

The paint high-pressure pump 3 is a positive displacement pump that is required to have a discharge pressure of about 20 MPa, and typically a diaphragm pump, and preferably a duplex diaphragm pump for the purpose of providing countermeasures against pulsation, is selected. Although a plunger pump can also be used depending on the paint, since there is the risk of the plunger seal becoming adhered with paint, it is normally not selected. The plunger seal can be suitably immersed in a solvent as a countermeasure for this.

A pneumatic or motorized drive source is suitably selected for the pump drive source according to the location where the device is installed. The paint is normally pressurized to about 10 MPa with the paint high-pressure pump 3, is heated to about 40° C. with the paint heater 5 as necessary, and is sent to the mixer 15. At this time, in the case of operating at a constant pressure, operation is carried out in which the pump flow rate is set to be higher than the spraying flow rate (determined by the pressure and nozzle orifice), and the surplus is returned to the paint tank 1 from the back pressure valve 4. At this time, the control pressure (system pressure) of constant-pressure operation becomes the primary pressure of the back pressure valve 4.

On the other hand, $CO_2$ passes through the filter 7 after aspirating the liquid portion in the cylinder 6, is cooled to a temperature equal to or lower than the saturation temperature with the cooler 8, and is supplied to suction of the $CO_2$ high-pressure pump 9. This liquid $CO_2$ is pressurized by the $CO_2$ high-pressure pump 9, and is then sent to the mixer 15 after being heated to supercritical $CO_2$ by the $CO_2$ heater 10 to the critical temperature (31° C.) or higher, and normally to 40° C.

Here, although a diaphragm pump or plunger pump and the like are normally selected for the $CO_2$ high-pressure pump, a duplex pump is used preferably to prevent pulsation in the same manner as in the case of paint. In addition, the required amount of supplied $CO_2$ is normally a small amount equal to 30% or less of the paint. Consequently, a plunger pump is used in the case of a low spraying flow rate.

The pressurized and heated paint and $CO_2$ are instantaneously mixed in the mixer 15 to form a paint/$CO_2$ mixture. The structure of the mixer preferably employs that of a micro mixture in consideration of rapid mixing and complete mixing. For example, a T-shaped mixer having a flow path diameter of 0.5 mm or less, a swirl-type micro mixer that utilizes swirl flow, an central collision type micro mixer that causes fluid to collide in the center of a minute space, or a double tube style micro mixer having an inner tube with inner diameter of 0.5 mm or less is used preferably.

The structure of a central collision type micro mixer is shown in FIGS. 3 and 4. In the drawings, $CO_2$ is introduced through an upper opening, and flows downward through an annular portion surrounding a needle that regulates the mixing state. On the other hand, paint is introduced through a lower opening, is divided into a plurality of flows (normally, into two or four flows) inside, and is collided with the $CO_2$ in the center of a minute space at the end of the needle causing the paint and $CO_2$ to be mixed instantaneously. The paint/$CO_2$ mixture is heated with the mixture heater 16 as necessary, and is then sprayed towards an object to be coated with the spray gun 19 after passing through the stop valve 17.

$CO_2$ is eliminated from the paint/$CO_2$ mixture immediately after spraying resulting in fine particles of paint. Although dependent on the temperature, pressure, structure of the spray gun, and typically the opening diameter of the nozzle orifice and the like, the particle diameter of these paint particles is normally within the range of 10 μm to 50 μm. Although coating is carried out by mounting the spray gun on a three-dimensional robot in the case the object to be coated has a three-dimensional shape, when switching the coated surface, for example, the stop valve 17 is closed, the stop valve 18 is opened immediately thereafter, and supercritical $CO_2$ is supplied to the nozzle of the spray gun to instantaneously carry out cleaning.

Unless this is carried out, the potential for blockage of the nozzle tip increases. At this time, although the paint high-pressure pump 3 continues to operate, if the device is in a constant-pressure operation mode, the paint is circulated by the back pressure valve 4 while still at the operating pressure. In the case of operating in a constant-volume operation mode, the paint is circulated by a small increase in pressure by setting the back pressure valve 4 to a value slightly higher than the operating pressure.

When resuming coating, spraying is resumed by closing the stop valve 18 and opening the stop valve 17. In this system, even if both the stop valves 17 and 18 are closed, surplus $CO_2$ can also be returned to the suction of the $CO_2$ high-pressure pump 10 with the back pressure valve 11 in the same manner as in the case of the paint, and there are no particular problems with this in terms of operation. However, since pressure is reduced by the back pressure valve 11, the $CO_2$ is preferably cooled with the cooler 12 in order to ensure a liquid state.

Next, a detailed explanation is provided of a second aspect of the present invention.

The present invention provides a novel coating method imposing a low burden on the environment that is capable of considerably reducing the generation of VOC while ensuring coating finish quality, namely coated film uniformity, smoothness, image clarity and the like, equivalent to that of organic solvent-based coating by substituting a minimal amount of carbon dioxide for the diluent solvent (VOC) used in large amounts in conventional spray coating with an organic solvent-based coating material, and to a device therefor.

The present invention is a one-liquid or two-liquid paint coating device that uses carbon dioxide which has been substituted for all or a portion of a diluent solvent (thinner) used in organic solvent-based spray coating, comprising: a paint supply line constituted by a tank for storing paint, a paint high-pressure pump for pressurizing the paint supplied from the tank to a prescribed pressure, and a paint primary pressure regulation valve for regulating discharge pressure of the paint high-pressure pump and returning a surplus to the paint tank; a carbon dioxide supply line constituted by a tank for storing liquid carbon dioxide, a cooler for cooling the liquid carbon dioxide to a prescribed temperature, a liquid carbon dioxide high-pressure pump for pressurizing the liquid carbon dioxide supplied from the cooler to a prescribed pressure, and a liquid carbon dioxide primary pressure regulation valve for regulating discharge pressure of the liquid carbon dioxide high-pressure pump and returning a surplus to suction of the same pump; a solvent supply line constituted by a solvent tank and a solvent high-pressure pump for pressurizing the solvent supplied from this tank to a prescribed pressure; a paint/carbon dioxide mixture line constituted by a mixer for mixing pressurized paint supplied from the paint supply line and pressurized carbon dioxide supplied from the carbon dioxide supply line, and a spray gun for spraying the mixed paint/carbon dioxide pressurized mixture supplied from the mixer onto an object to be coated at atmospheric pressure, wherein an organic solvent is preliminarily added to carbon dioxide prior to mixing with the paint.

In addition, the present invention is a method for coating a one-liquid or two-liquid paint using carbon dioxide by employing the above-mentioned coating device, comprising: preventing deposition of a polymer of a paint component that has entered as a result of backflow by preliminarily adding, to carbon dioxide, a true solvent component of the paint in at least an amount required for saturated solubility to lower the dissolving power of carbon dioxide with respect to the true solvent component.

In a preferable embodiment of the present invention, the paint is a one-liquid curing type paint or a two-liquid curing type paint, the organic solvent is a true solvent of the one-liquid curing type paint or two-liquid curing type paint, the organic solvent is added to the suction portion of the liquid carbon dioxide high-pressure pump, the organic solvent is added to the delivery portion (pressurized side) of the liquid carbon dioxide high-pressure pump, and the organic solvent is added to a line after a liquid carbon dioxide heater.

In addition, in a preferable embodiment of the present invention, mixing of the organic solvent and carbon dioxide is carried out with a micro mixer, the micro mixer used to mix the organic solvent and carbon dioxide is a T-shaped micro mixer having a flow path diameter of no more than 0.5 mm, the micro mixer used to mix the paint and carbon dioxide is a double tube style micro mixer in which an inner diameter of an inner tube through which carbon dioxide enters is no larger than 0.5 mm and an inner diameter of an outer tube is within a range of 2.5 mm to 5 mm, and a check valve is provided at a location as close as possible to the connection where the carbon dioxide supply line is connected to the micro mixer used to mix the paint and carbon dioxide, and a structure that prevents backflow of the paint into the carbon dioxide supply line is provided.

In addition, in a preferable embodiment of the present invention, a micro mixer used to mix the paint and carbon dioxide is a T-shaped micro mixer that has a flow path diameter of no more than 2 mm, has a structure that allows carbon dioxide to flow in from a lower portion and the paint to flow in from an upper portion so as to be mutually opposed and allows the mixture to be discharged from the side at 90 degrees, is provided with a metal ball inside thereof for preventing backflow, and has a structure for preventing backflow of the paint into the carbon dioxide line; a micro mixer used to mix the paint and carbon dioxide is a T-shaped micro mixer that has a flow path diameter of no more than 2 mm, has a structure that allows carbon dioxide to flow in from a lower portion and the paint to flow in from the side at 90 degrees and allows the mixture to be discharged upward, is provided with a metal ball inside thereof for preventing backflow, and has a structure for preventing backflow of the paint into the carbon dioxide line, and a true solvent component is added within a range of 20% to 50% per weight of carbon dioxide.

In general, organic solvent-based coating requires viscosity to be lowered to a viscosity that allows spraying by adding a diluent solvent such as toluene or xylene at 50% to 150% by weight of the paint, namely a polymer and true solvent that imparts fluidity by dissolving the polymer. The paint/diluent solvent mixture for which viscosity has been lowered is coated onto an object to be coated by being atomized as fine droplets by an air spraying method that uses air for the spraying medium or a high-pressure spraying method that does not use atomized air.

The present invention provides a coating method in which carbon dioxide is substituted for all or a portion of a diluent solvent used in the organic solvent-based coating described above. A paint targeted in the present invention can be broadly classified into two types consisting of one-liquid curing type paint and two-liquid curing type paint, and is mainly targeted for use with one-liquid curing type paint.

The paint is composed of a polymer that forms a paint film and a true solvent that imparts fluidity by dissolving the polymer, and the true solvent is composed of an organic solvent for making various adjustments such as volatility after spraying or leveling in the film formation process, examples of which include unsaturated hydrocarbons, aromatic hydrocarbons, ketones, esters, ethers, alcohols and mixtures thereof.

A one-liquid paint refers to a paint that is used without diluting or is used by incorporating only a diluent such as thinner (viscosity adjuster), and is mainly used for electrical appliances such as television cabinets or for automobile parts, industrial parts and the like. This paint consists mainly of an acrylic resin, and forms a paint film without using a curing agent. This paint is quick-drying, has high hardness and has superior wear resistance as a result of being blended with nitrocellulose. Examples of applicable materials include polystyrene resin, ABS resin, AS resin, Noryl resin, unplasticized vinyl chloride resin and polycarbonate resin, and are used in a wide range of applications.

On the other hand, two-liquid paint refers to paint that is mixed with a curing agent prior to use and is cured and dried by a chemical reaction, has superior alcohol resistance and wear resistance, and is mainly used for automobile interiors, precision equipment, optical equipment and the like. This paint is a two-liquid reactive curing type acrylic urethane paint that is mainly composed of an acrylic resin and uses a polyisocyanate compound for the curing agent.

In the present invention, although carbon dioxide is mixed and dissolved in the paint, the conditions thereof consist of a temperature of 30° C. to 70° C. and preferably 35° C. to 45° C., and a pressure of 5 MPa to 20 MPa and preferably 7 MPa to 10 MPa. Thus, although it is necessary to pressurize the paint, since viscosity is high at 50 cp to 500 cp, a piston pump or diaphragm pump is generally used for the paint high-pressure pump.

A gear pump can also be employed if the paint viscosity is sufficiently high. On the other hand, a plunger pump in addition to a piston pump or diaphragm pump can be employed for the carbon dioxide high-pressure pump. However, since it is advantageous to pressurize liquid carbon dioxide when pressuring carbon dioxide, cooling is required in a stage prior to the pump in this case.

In the present invention, it is necessary for the organic solvent, and particularly the true solvent per se that composes the paint used, to be supplied to the carbon dioxide line, and normally a piston pump, diaphragm pump or plunger pump is used. Although a sealed pump is required for the above-mentioned paint to prevent the sliding portion from contacting the air resulting in deposition of the polymer, since this is not required for the true solvent, the use of a plunger pump is advantageous in terms of costs.

Although there are no particular limitations on the type of heater in the present invention, the heater is required to control the temperature at as constant a level as possible such as when starting operation of the device or when changing the flow rate, and prevent any large changes in the temperature of each fluid such as when temporarily interrupting spraying and resuming spraying when switching the coated surface, for example. Consequently, instead of a commonly used electrical heating type heater, a tank/coil type heat exchanger is used preferably in which a high-pressure line through which a fluid passes is immersed in the shape of a coil in a tank filled with a heating medium (and normally, water).

In the present invention, it is necessary to preliminarily add a fixed amount of organic solvent, and preferably the same true solvent as that of the paint, to carbon dioxide prior to mixing the paint and carbon dioxide. An organic solvent refers to a single or a plurality of components in a true solvent added to dissolve the polymer in the paint. Here, the true solvent component of the paint is preliminarily added to carbon dioxide in the amount required for saturated solubility (normally about 10% to 50% per weight of carbon dioxide, although dependent on the true solvent composition).

As a result, migration of only the true solvent to carbon dioxide from the paint component that has entered by backflow can be prevented due to having lowered the dissolving power of carbon dioxide with respect to the true solvent component, and as a result thereof, deposition of the polymer can be prevented. Thus, since it is necessary to dissolve the true solvent component in carbon dioxide both rapidly and completely, a micro mixer, such as a T-shaped micro mixer having a flow path diameter of 0.5 mm or less, is used preferably.

In the present invention, it is necessary to efficiently mix the paint and carbon dioxide and dissolve carbon dioxide in the paint. Although an inline mixer in the form of a static mixer applying the principle of fluid multistage separation has conventionally been used for this purpose, in addition to it not always being possible to realize adequate mixing and dissolution with this type of mixer, with respect to one-liquid curing type paints, blockage frequently occurs in the mixer or in the carbon dioxide line immediately before the mixer.

In the case of static mixers, which apply the principle of fluid multistage separation, the flow tends to be temporarily interrupted, and this causes a temporarily fluctuation in pressure resulting in the true solvent component in the paint migrating to carbon dioxide prior to the carbon dioxide dissolving in the paint, and as a result thereof, is thought to result in a series of events consisting of polymer deposition, pressure increase, blockage and interruption of spraying.

In addition, even in the case of T-shaped micro mixers having a flow path diameter of 0.5 mm or less and central collision type micro mixers that can be exhibited to demonstrate rapid mixing, when the flow of fluid is subjected to constriction followed by expansion, fluctuations occur in the pressure, which are thought to prevent long-term, stable operation.

Since ultraviolet curing type paint only undergoes curing of the polymer when irradiated with ultraviolet light, it is hardly affected at by slight fluctuations in pressure. However, with respect to one-liquid curing type paints, since the true solvent component is extracted into carbon dioxide due to fluctuations in pressure, which is presumed to instantaneously cause deposition of the polymer, the flow is required to be as smooth as possible in the mixer and in the piping configuration from the mixer to the spray gun.

In contrast, stable paint has been determined to able to be continuously supplied over a long period of time by using a double tube style micro mixer in which the inner diameter of the inner tube through which carbon dioxide enters is 0.5 mm or less, the inner diameter of the outer tube is 2.5 mm to 5 mm, and in which paint flows into an annular portion of the inner diameter of the outer tube and the outer diameter of the inner tube, and a simple line is present beyond the portion where carbon dioxide is introduced.

Naturally, it is not preferable to couple a static mixer after the mixer, and it is preferable that the line diameter be changed as little as possible until it reaches the spray gun. However, similar to ultraviolet curing-type paints, although the paint and carbon dioxide may be present in two phases between the mixer and the spray gun depending on the conditions, in this case, since the viscosities of the two fluids differ considerably, spraying becomes unstable resulting in the risk of being unable to realize attractive coating.

Although the solubility of carbon dioxide in the paint varies considerably depending on the type of paint, temperature and pressure, it was determined that a fixed retention time is required until carbon dioxide completely dissolves in the paint. The time required for this dissolution is also affected by mixability (line diameter and line configuration) beyond the mixer, and the installation of several bent portions for the purpose of improving mixability is recognized to be effective.

Although the spray gun used in the present invention is only required to be a high-pressure spray gun of the airless type, since ultimate control of spraying flow rate, spraying pressure and spraying pattern is dependent on the opening diameter (equivalent diameter) and shape thereof of the high-pressure nozzle orifice installed on the spray gun, it is extremely important. Although spraying flow rate varies considerably depending on the setting of the coated amount per unit time, a value is typically selected within the range of 50 g/min to 500 g/min in terms of the paint flow rate.

In the case of a spraying flow rate of 100 g/min, for example, if the pressure at that time is 5 MPa to 10 MPa, a value of 0.1 mm to 0.2 mm is selected for the equivalent diameter of the orifice. Although the shape of the orifice varies according to the desired spraying pattern, in the case of a flat spray, the shape of the orifice is oval. In addition, although a full cone spray results if the shape of the orifice is circular, by controlling the spraying pattern by blowing air immediately after spraying, a full cone spray can be changed to a flat spray.

The following provides a detailed explanation of an embodiment of the present invention with reference to the attached drawings. The device shown in FIG. 7 is an example of a preferable embodiment of the carbon dioxide coating device according to the present invention. Reference symbols in the drawing indicate means indicated below. Namely, reference symbol 1 indicates a paint tank, 2 a paint filter, 3 a paint high-pressure pump, 4 a paint back pressure valve (primary pressure regulation valve), 5 a paint heater, 6 a $CO_2$ cylinder, 7 a $CO_2$ filter, 8 a $CO_2$ cooler, 9 a $CO_2$ high-pressure pump, 10 a $CO_2$ heater, 11 a $CO_2$ back pressure valve (primary pressure regulation valve), 12 a $CO_2$ cooler 2, 13 a paint check valve, 14 a $CO_2$ check valve, 15 a mixer, 16 a mixture heater, 17 a mixture stop valve, 18 a $CO_2$ stop valve, 19 a spray gun, 30 a solvent tank, 31 a solvent high-pressure pump, and 31 a mixer.

In providing a detailed explanation of the above-mentioned device and the operation thereof, paint is filled into the paint tank 1, the paint is pressurized (to several atmospheres) with nitrogen gas and the like as necessary, and the paint is supplied to suction of the paint high-pressure pump 3 via the filter 2. Although the aperture size of the filter 2 is normally several tens of micrometers in the case of a clear paint, in the case of colored paint, it is preferably several hundreds of micrometers since the paint contains solid pigment.

The paint high-pressure pump 3 is a positive displacement pump that is required to have a discharge pressure of about 20 MPa, and typically a diaphragm pump, and preferably a duplex diaphragm pump for the purpose of providing countermeasures against pulsation, is selected. Although a plunger pump can also be used depending on the paint, since there is the risk of the plunger seal becoming adhered with paint, it is normally not selected. The plunger seal can be suitably immersed in a solvent as a countermeasure for this.

A pneumatic or motorized drive source is suitably selected for the pump drive source according to the location where the device is installed. The paint is normally pressurized to about 10 MPa with the paint high-pressure pump 3, is heated to about 40° C. with the paint heater 5 as necessary, and is sent to the mixer 15. At this time, in the case of operating at a constant pressure, operation is carried out in which the pump flow rate is set to be higher than the spraying flow rate (determined by the pressure and nozzle orifice), and the surplus is returned to the paint tank 1 from the back pressure valve 4. At this time, the control pressure (system pressure) of constant-pressure operation becomes the primary pressure of the back pressure valve 4.

On the other hand, $CO_2$ passes through the filter 7 after aspirating the liquid portion in the cylinder 6, is cooled to a temperature equal to or lower than the saturation temperature with the cooler 8, and is supplied to suction of the $CO_2$ high-pressure pump 9. This liquid $CO_2$ is pressurized by the $CO_2$ high-pressure pump 9, and is then sent to the mixer 15 after being heated to supercritical $CO_2$ by the $CO_2$ heater 10 to the critical temperature (31° C.) or higher, and normally to 40° C.

Here, although a diaphragm pump or plunger pump and the like is normally selected for the $CO_2$ high-pressure pump, a duplex pump is used preferably to prevent pulsation in the same manner as in the case of paint. In addition, the required amount of supplied $CO_2$ is normally a small amount equal to 30% or less of the paint. Consequently, a plunger pump is used in the case of a low spraying flow rate.

In addition, solvent from the solvent tank 30 is pressurized by the solvent high-pressure pump 31, and is mixed with the pressurized and heated $CO_2$ in the mixer 32. A T-shaped micro mixer is preferably used for this mixer in consideration of cost and installation restrictions. However, the mixer can be installed in the suction portion of the $CO_2$ high-pressure pump 9 or immediately after the delivery portion.

The pressurized and heated paint, $CO_2$ and solvent are instantaneously mixed in the mixer 15 to form a paint/$CO_2$ mixture. As was previously described, the structure of the mixer preferably employs that of a double tube style micro mixer having an inner tube with inner diameter of 0.5 mm or less. An overview of the double tube style micro mixer used in the present invention is shown in FIG. 8. In addition, a T-shaped micro mixer provided with a check mechanism is also used preferably (see FIG. 14).

The paint/$CO_2$ mixture is heated with the mixture heater 16 as necessary, and is then sprayed towards an object to be coated with the spray gun 19 after passing through the stop valve 17. $CO_2$ is eliminated from the paint/$CO_2$ mixture immediately after spraying resulting in fine particles of paint. Although dependent on the temperature, pressure, structure of the spray gun, and typically the opening diameter of the nozzle orifice and the like, the particle diameter of these paint particles is within the range of 10 μm to 50 μm.

Although coating is carried out by mounting the spray gun on a three-dimensional robot in the case the object to be coated has a three-dimensional shape, when switching the coated surface, for example, the stop valve 17 is closed, the stop valve 18 is opened immediately thereafter, and supercritical $CO_2$ is supplied to the nozzle of the spray gun to instantaneously carry out cleaning. Unless this is carried out, the potential for blockage of the nozzle tip increases.

At this time, although the paint high-pressure pump 3 continues to operate, if the device is in a constant-pressure operation mode, the paint is circulated by the back pressure valve 4 while still at the operating pressure. In the case of operating in a constant-volume operation mode, the paint is circulated by a small increase in pressure by setting the back pressure valve 4 to a value slightly higher than the operating pressure. When resuming coating, spraying is resumed by closing the stop valve 18 and opening the stop valve 17.

In this system, even if both the stop valves 17 and 18 are closed, surplus $CO_2$ can also be returned to the suction of the $CO_2$ high-pressure pump 10 with the back pressure valve 11 in the same manner as in the case of the paint, and there are no particular problems with this in terms of operation. However, since pressure is reduced by the back pressure valve 11, the $CO_2$ is preferably cooled with the cooler 12 in order to ensure a liquid state.

The following effects are demonstrated by the present invention.

(1) A novel low environmental burden type coating device capable of considerably reducing generation of VOC, and a coating method therefor, can be provided.

(2) A minimal amount of carbon dioxide can be substituted for a diluent solvent (VOC) used in large amounts in conventional spray coating with an organic solvent-based coating material.

(3) A coating technology can be provided that prevents discharge of diluent solvent (VOC) into the atmosphere.

(4) A practically applicable coating technology can be provided that is able to reliably inhibit the problem of blockage in the device caused by high viscosity of the paint.

(5) A low environmental burden type one-liquid or two-liquid paint capable of considerably reducing generation of VOC, and a coating device therefor, can be provided.

(6) A coating technology for one-liquid or two-liquid paint can be provided that prevents discharge of diluent solvent (VOC) into the atmosphere.

BEST MODE FOR CARRYING OUT THE INVENTION

Although the following provides a detailed explanation of the present invention based on examples thereof, the present invention is not limited by these examples.

Example 1

The following indicates an example of a first aspect of the present invention.
(Comparison of Mixer Performance)

Figure 1:
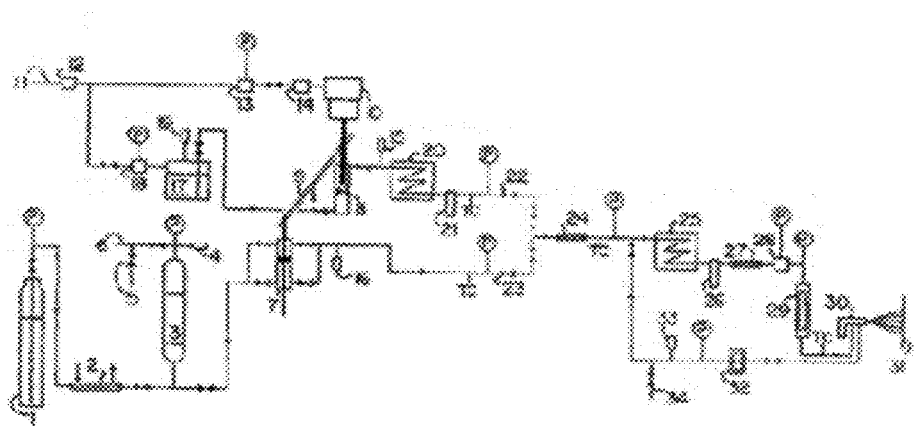
FIG. 1 indicates a process flow of a coating device indicated in a prior patent.
Figure 2:
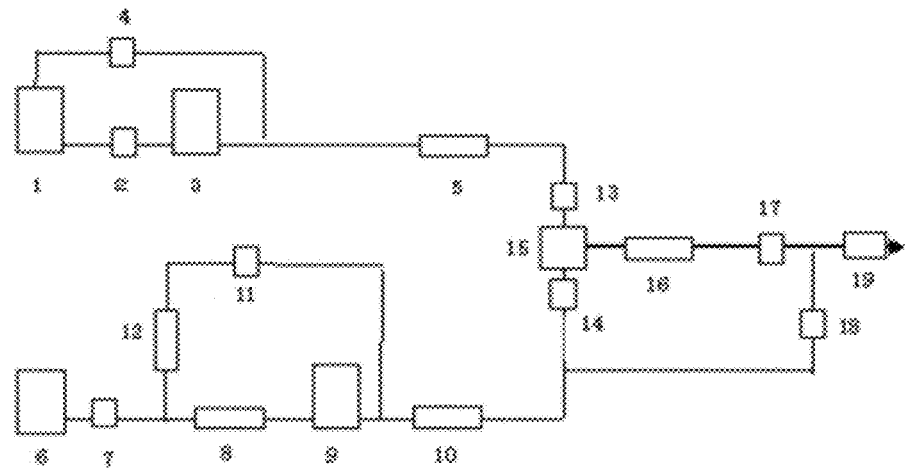
FIG. 2 indicates an example of an embodiment of a carbon dioxide coating device according to a first aspect of the present invention.
Figure 3:
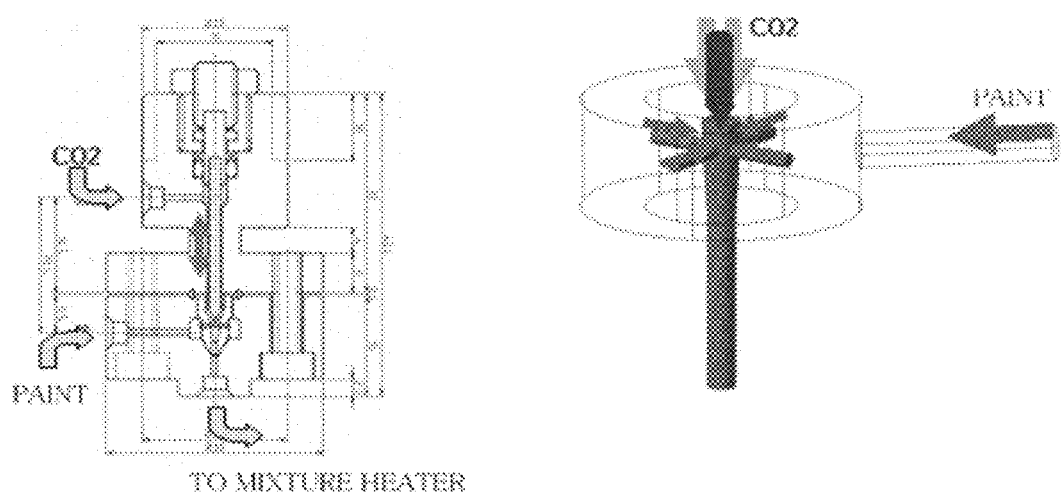
FIG. 3 indicates an overview of a central collision type mixer.
Figure 4:
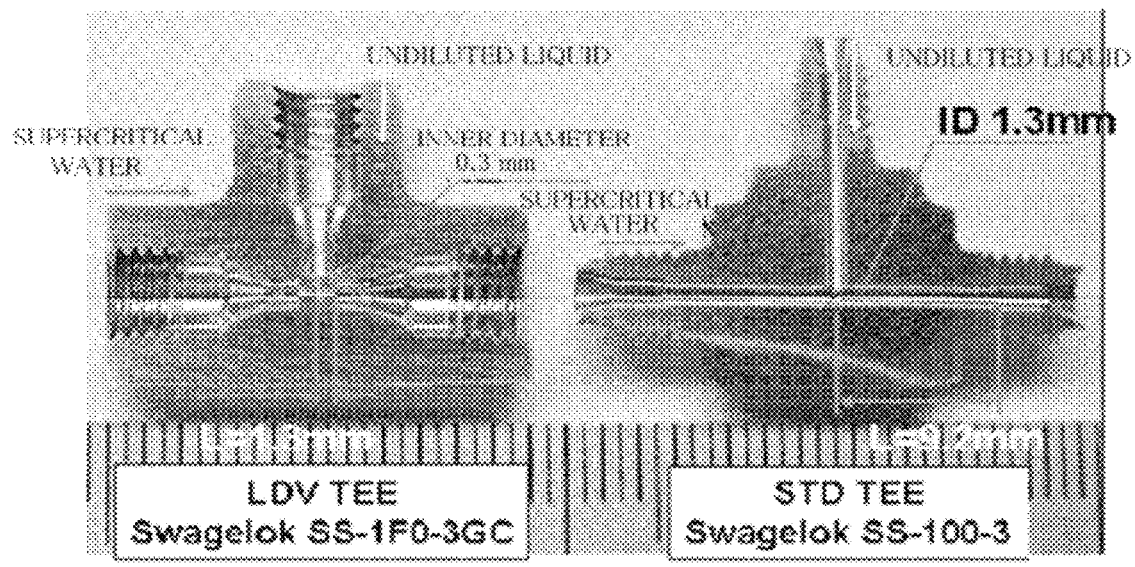
FIG. 4 shows a cross-sectional view of a central collision type mixer.
Figure 5:
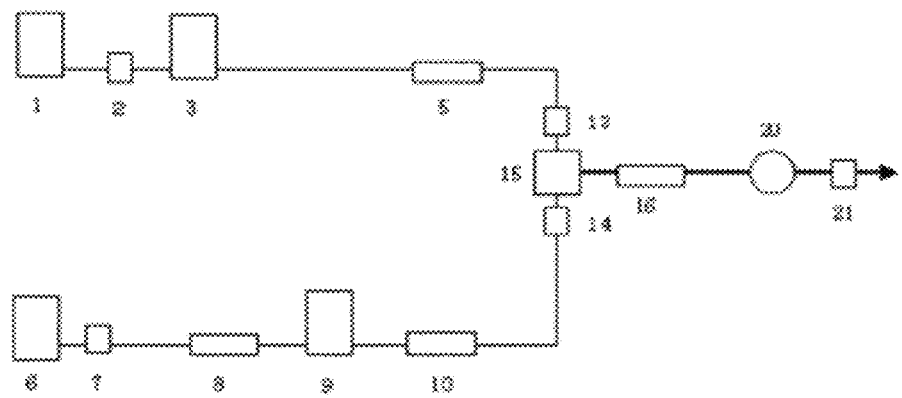
FIG. 5 indicates the flow of a $CO_2$ solubility measurement system.

The solubility of $CO_2$ in an ultraviolet curing type clear paint was evaluated by directly observing the state of the mixture through a pressure-proof observation window using a 1/16-inch T-shaped coupling having a flow path diameter after mixing of 1.3 mm (standard T coupling, abbreviated as STD-T), a 1/16-inch T-shaped coupling having a flow path diameter after mixing of 0.3 mm (low dead volume T coupling, abbreviated as LDV-T) and a central collision type mixer having a flow path diameter after mixing of 1 mm for the mixers used for initial mixing of the paint and $CO_2$. The flow of the solubility measurement system is shown in FIG. 5.

More specifically, the flow rate of the paint high-pressure pump was set to a fixed rate of 50 g/min, the flow rate of the $CO_2$ high-pressure pump was gradually increased, and the point where the mixture changed from a clear, single-phase state to a gas-liquid two-phase state was evaluated as the limiting solubility in the mixer. At that time, the temperature was held constant at 40° C. and the pressure was set to 6 MPa and 10 MPa. The experiment results are shown in Table 1.

TABLE 1

| Mixer Type | Limiting solubility at 40° C./6 MPa (g-$CO_2$/g-paint) | Limiting solubility at 40° C./10 MPa (g-$CO_2$/g-paint) |
|---|---|---|
| STD-T | 0.19 | 0.6 |
| LDV-T | 0.52 | 0.6 |
| Central collision type mixer | 0.34 | 0.55 |

According to the above table, although there were no large differences in limiting solubility observed among the types of mixers under conditions of 10 MPa, at 6 MPa, in contrast to the limiting solubility for STD-T being only 19%, that of the central collision type mixer was 34% and that of LDV-T was 52%, thereby demonstrating a considerable difference in mixability. On the basis of these results, initial mixability was determined to be favorable in the order of LDV-T>central collision type mixer>STD-T.

Example 2

Effect of Static Mixer after Initial Mixing

A comparison was made of the case of using a conventionally used static mixer (element outer diameter: 2.4 mm×no. of elements: 60, abbreviated as SM) in a stage after an LDV-T used as the mixer for initial mixing of paint and $CO_2$ and the case of not using a static mixer. The evaluation system and method were the same as those of Example 1. The results are shown in Table 2.

TABLE 2

| Mixer configuration | Limiting solubility at 40° C./6 MPa ($g-CO_2$/g-paint) | Limiting solubility at 40° C./10 MPa ($g-CO_2$/g-paint) |
| --- | --- | --- |
| LDV-T only | 0.52 | 0.6 |
| LDV-T + SM | 0.55 | 0.6 |

According to the above table, it was clearly determined that hardly any effects attributable to the SM employed in the prior patent are observed if LDV-T is used for initial mixing.

Example 3

Effect of Time from Initial Mixing to Pressure-Proof Observation Window

Using an LDV-T for the mixer used for initial mixing of the paint and $CO_2$, the time from immediately thereafter to the pressure-proof observation window was changed to various times using a ¼-inch line, and the effect was evaluated. The mixing times in Example 1 and Example 2 were about 37 seconds. The evaluation system and method were the same as those of Example 1.

As a result, although there were no large differences observed in limiting solubility attributable to mixing time, as a result of detailed observation, in cases in which the mixing time was less than 15 seconds, a state in which a single-phase state and two-phase state repeatedly alternated was observed even in the dissolving range. This means that a fixed amount of time is required until dissolution is reached even if the paint and $CO_2$ are mixed physically almost completely, and this is extremely important from the viewpoint of spraying stability.

Example 4

Coating Experiment 1

A coating experiment was conducted on a commercially available ultraviolet curing type clear paint (not containing thinner) for the paint. The typical paint composition consisted of 49% resin component, 47% true solvent and 4% additives, and the resin component mainly consisted of multifunctional acrylate while also containing a thermoplastic acrylate and urethane acrylate, respectively. The true solvent was composed of toluene, butyl acetate, n-butyl alcohol, xylene and ethylbenzene in that order with toluene having the highest content, and the additives contained consisted of a photopolymerization initiator along with trace amounts of an ultraviolet absorber and surface conditioner.

A duplex diaphragm pump was used for the paint high-pressure pump 3, a duplex plunger pump was also used for the $CO_2$ high-pressure pump 9, and temperatures of the heaters 5 and 10 were controlled to 40° C., an LDV-T was used for the mixer 15, the mixing time from the LDV-T to the spray gun 19 was set at 37 seconds, and the device was operated in a constant-pressure operation mode at 7 MPa.

The paint flow rate at that time was 45 g/min, the $CO_2$ flow rate was 9 g/min (20% of the paint flow rate), the paint/$CO_2$ mixture was confirmed to consist of a single phase from the pressure-proof observation window, and hand-blown coating was carried out onto a plastic substrate using a spray gun having a nozzle orifice equivalent diameter of 0.15 mm.

At this time, a decrease in viscosity of the paint/$CO_2$ mixture from 11 cp to 12 cp prior to addition of $CO_2$ to 1 cp to 2 cp after addition was confirmed with an online rheometer. After holding at room temperature for 5 minutes, the coated plastic substrate was dried for 10 minutes in a dryer at 50° C., followed by curing the coated film with an ultraviolet irradiation device and evaluating the coated film surface.

As a result, the average film thickness was 20 µm, the average roughness was 0.4 µm, and the coated film was evaluated to be of a practical level, equivalent to that obtained by organic solvent air spraying carried out by adding amount of thinner equal to that of the paint. Furthermore, as a result of air spray coating the same ultraviolet curing-type clear paint without adding thinner, the film thickness was 20 µm, the average roughness was 0.9 µm, and the roughness was confirmed to have more than doubled. These results verify the superiority of carbon dioxide coating.

Example 5

Coating Experiment 2

A coating experiment was conducted using an additional type of ultraviolet curing-type clear paint. A novel paint was used having a composition consisting of about 80% resin (multifunctional acrylate), about 20% true solvent (isopropyl alcohol) and a small amount of photopolymerization initiator. Although the coating device and coating method were nearly the same as those used in Example 4, spraying was carried out by mounting the spray gun on a two-dimensional coating robot.

The viscosity of the paint/$CO_2$ mixture decreased from 40 cp before addition of $CO_2$ to several cp after addition. Following coating, as a result of carrying out treatment in the same manner as Example 4 and observing the coated film surface, a coated film was confirmed to have been formed that presented no problems in terms of practical use. Since this paint has a high resin content of 80% and is not diluted with thinner, it is clearly extremely highly effective in reducing VOC levels.

Example 6

Coating Experiment 3

A coating experiment was conducted using still another type of ultraviolet curing-type clear paint. The composition of the paint used consisted of about 75% resin (multifunctional acrylate), about 20% true solvent (propylene glycol monomethyl ether) and about 5% photopolymerization initiator. The coating device and method were the same as those of Example 5. The viscosity of the paint/$CO_2$ mixture decreased from 60 cp before addition of $CO_2$ to several cp after addition, and as a result, a coated film was confirmed to have been formed that presented no problems in terms of practical use.

Example 7

Coating Experiment 4

Next, a coating experiment was conducted on a two-liquid curing-type acrylic urethane clear paint. The composition of the main agent consisted of 42% resin (acrylic polyol) and 58% true solvent (mainly composed of toluene and containing isobutyl acetate), while the composition of the curing agent consisted of 55% resin (polyisocyanate prepolymer), and 45% true solvent (containing toluene along with propylene glycol monomethyl ethyl acetate and ethyl acetate).

The experiment was carried out by preliminarily mixing the main agent and the curing agent at a mixing ratio of 5:1, and the filling the mixture into the paint tank 1. $CO_2$ was added to the paint (main agent+curing agent) at a weight ratio of 20% to 30% followed by carrying out coating. Other conditions and the coating method were as described in the above-mentioned examples. The paint viscosity decreased from 50 cp to 60 cp before addition of $CO_2$ to several cp after addition. After holding at room temperature for 5 minutes, the coated plastic substrate was dried for 30 minutes in a dryer at 50° C. to 60° C. to cure the coated film followed by evaluating the coated film surface.

As a result, although a coated film was formed, problems remained with respect to smoothness. Consequently, as a result of adding a special-purpose diluent thinner at a weight ratio of 20% to the paint having the above-mentioned mixing ratio in order to increase leveling performance of the paint film, and then carrying out the same coating procedure and post-treatment, a coated film was confirmed to have been formed that presented no problems in terms of practical use.

Example 8

Coating Experiment 5

Next, a coating experiment was conducted on a one-liquid curing-type acrylic clear paint. The paint composition consisted of 28% resin and 72% true solvent. The resin component consisted mainly of acrylic resin and also contained nitrocellulose, while the true solvent consisted of an ester-based solvent, alcohol-based solvent, hydrocarbon-based solvent, and ketone-based solvent in that order with the ester-based solvent having the highest content. In the experiment, coating was carried out by adding $CO_2$ to the paint at a weight ratio of 20%. Other conditions and the coating method were as described in the above-mentioned examples.

The paint viscosity decreased from 120 cp to 140 cp before addition of $CO_2$ to 20 cp or less after addition. However, although coating (spraying) was able to be carried out in a short period of time, a large number of clump of paint were adhered to the surface of the plastic substrate, and a uniform coated film was not formed.

Consequently, only the true solvent component was added to the paint at a weight ratio of 20% to 40% in order to improve leveling, and the same coating procedure and post-treatment (as Example 7) were carried out. As a result, a uniform coated film was formed and the coated film was evaluated to be free of problems in terms of practical use.

Example 9

Coating Experiment 6

Figure 6:
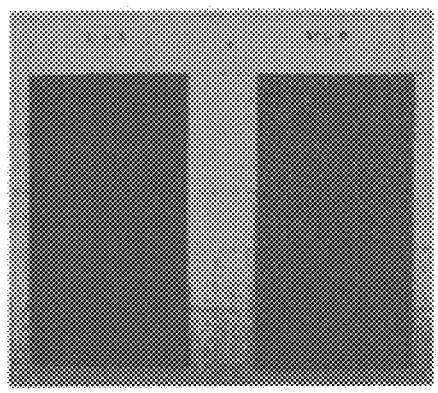
FIG. 6 indicates coating results of Example 9.
Figure 6:
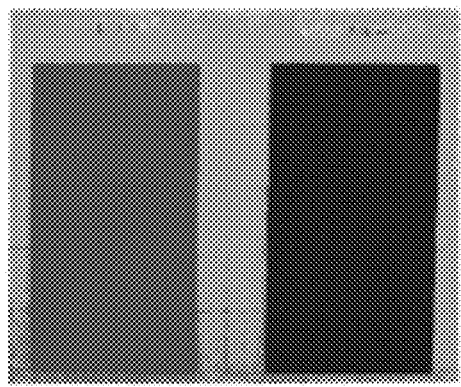
Figure 7:
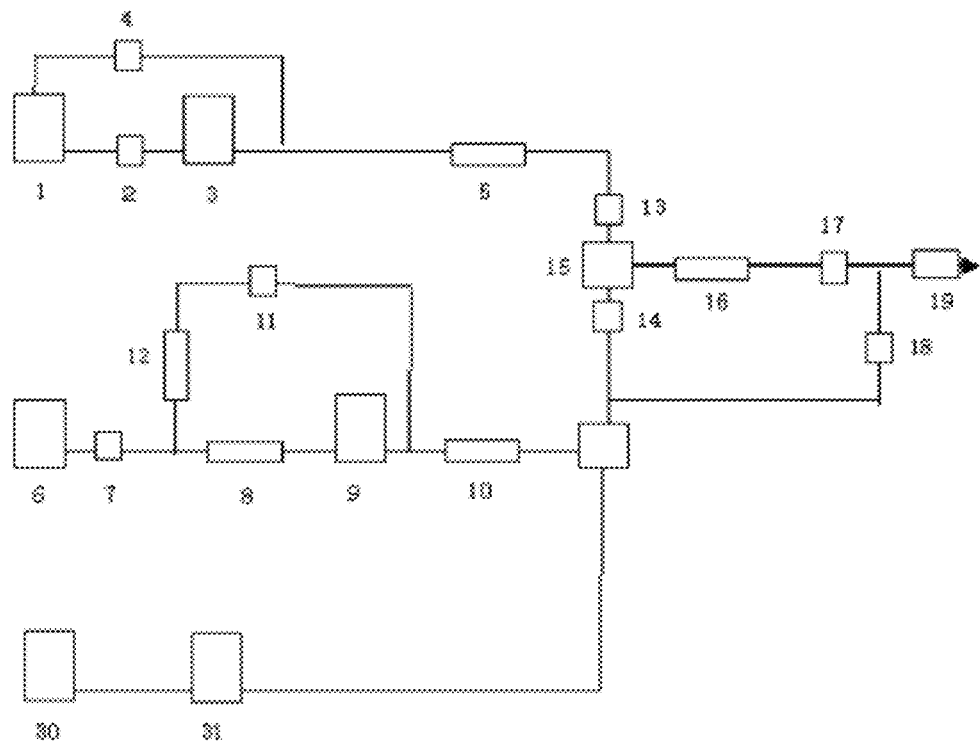
FIG. 7 indicates an example of an embodiment of a carbon dioxide coating device according to a second aspect of the present invention.
Figure 8:
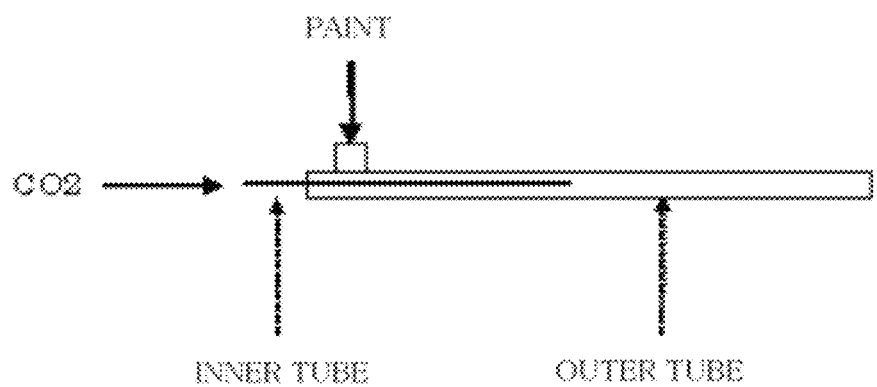
FIG. 8 indicates an overview of a double tube style micro mixer.

A colored coating experiment was conducted by mixing carbon black and other pigments into a two-liquid curing type acrylic urethane paint and a one-liquid curing type acrylic paint. The experiment conditions and method were respectively the same as in the above-mentioned examples. The results are shown in FIG. 6. As a result, uniform colored coated films in red, pink, blue and the like were formed, and were evaluated as being free of problems in terms of practical use.

The following indicates examples and comparative examples of a second aspect of the present invention.

Comparative Example 1

A coating experiment was conducted using a one-liquid curing type paint (resin composition: acrylic resin, nitrocellulose; true solvent composition: butyl acetate, cyclohexanone, isobutyl alcohol, ethyl acetate, butyl Cellosolve, methyl isobutyl ketone). Operating conditions consisted of 40° C. and 80 MPa, the paint flow rate was set to 40 g/min, the $CO_2$ flow rate was set to 8 g/min, and a 1/16-inch T-shaped coupling having a flow path diameter after mixing of 0.3 mm (low dead volume T coupling, abbreviated as LDV-T) was used for the mixer. In this experiment, however, a true solvent was not added to $CO_2$.

At the start of the experiment, although the solvent was switched to paint after confirming stable mixing of the paint and $CO_2$, pressure began to increase immediately after switching to paint caused by the high viscosity of the paint, and a short time thereafter, the pressure on the $CO_2$ side increased rapidly preventing further operation. After coating had stopped, the $CO_2$ line was disassembled, and as a result of investigating the status of the line, paint polymer was observed to have been deposited in the $CO_2$ line upstream from the mixer (between the mixer and the check valve).

Although this phenomenon occurs because the paint is an incompressible fluid causing pressure to increase suddenly, the increase in pressure on the $CO_2$ side was delayed since the $CO_2$ is a compressible fluid, and at that time, the paint flowed back into the $CO_2$ line, and the paint polymer is presumed to have been deposited as a result of the true solvent component in the paint having been extracted into the $CO_2$.

Comparative Example 2

A coating experiment was conducted in the same manner as Comparative Example 1. However, operation was carried out so that pressure did not rise by setting the back pressure valve of the paint line to be slightly higher than the operating pressure. As a result, although steady-state operation was able to be established under conditions of 40° C. and 8 MPa, when operation was continued for more than 10 minutes, operating pressure became unstable and ultimately the pressure on the $CO_2$ side increased rapidly thereby preventing further operation.

After coating had stopped, the $CO_2$ line was disassembled, and as a result of investigating the status of the line, paint polymer was observed to have been deposited in the $CO_2$ line upstream from the mixer (between the mixer and the check valve) in the same manner as in Comparative Example 1. This phenomenon is presumed to involve a temporary fluctuation in pressure in the line configuration from the mixer to the spray gun during steady-state operation, and because of this, the paint polymer is presumed to have been deposited as a result of the backflow of the paint into the $CO_2$ line and the true solvent component in the paint having been extracted into the $CO_2$.

Comparative Example 3

Figure 9:
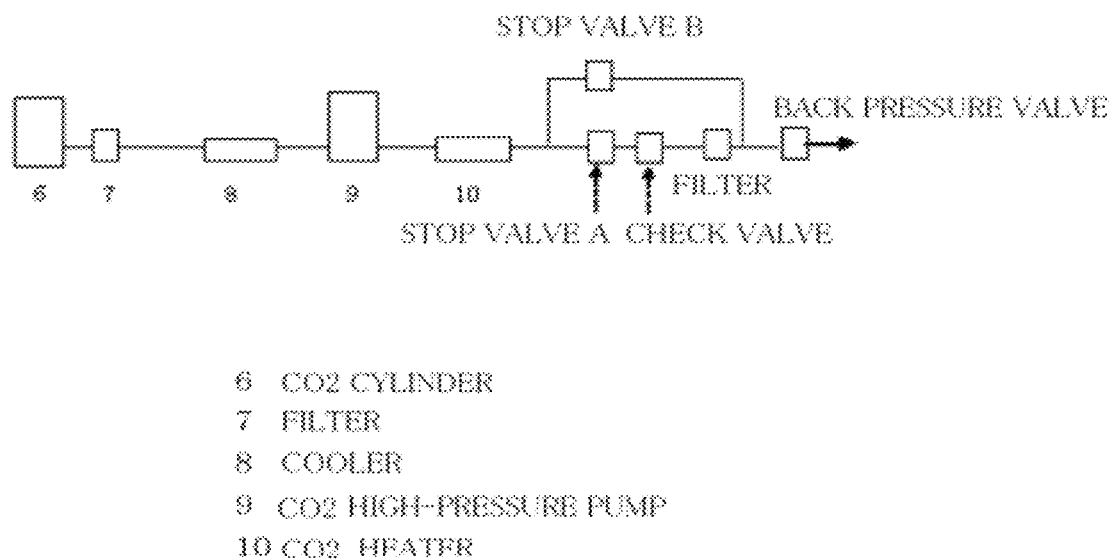
FIG. 9 indicates an evaluation system of Comparative Example 3 constructed to confirm polymer deposition.

An evaluation system as shown in FIG. 9 was constructed to reconfirm polymer deposition, a stop valve A was closed and a stop valve B was opened after filling and sealing a single-liquid curing type paint, and $CO_2$ was allowed to pass through the check valve at a prescribed temperature and pressure. After confirming steady-state operation, the stop valve A was opened, the stop valve B was closed, and $CO_2$ was allowed to pass through the check valve for a fixed amount of time (about 10 minutes). Subsequently, the stop valve A was closed, the stop valve B was opened, and the pressure was reduced to atmospheric pressure followed by confirmation of the status inside the check valve.

The results are summarized in Table 3. The polymer was deposited both in the case of liquid $CO_2$ and supercritical $CO_2$ (having a temperature and pressure equal to or higher than the critical point, or having a temperature equal to higher than the critical point and a pressure equal to or lower than the critical point). Polymer deposition was unable to be prevented even in cases in which the solubility coefficient is 4 or less in particular. Although a reference experiment was conducted using the same procedure by filling an ultraviolet curing type paint into the check valve, polymer deposition was not observed.

TABLE 3

| Temperature/pressure | $CO_2$ phase | Check valve status |
|---|---|---|
| 20° C./8 MPa | Liquid | Polymer deposition |
| 35° C./8 MPa | Supercritical | Polymer deposition |
| 35° C./6.5 MPa | Supercritical | Polymer deposition |
| 45° C./6.5 MPa | Supercritical | Polymer deposition |

Example 10

Figure 10:
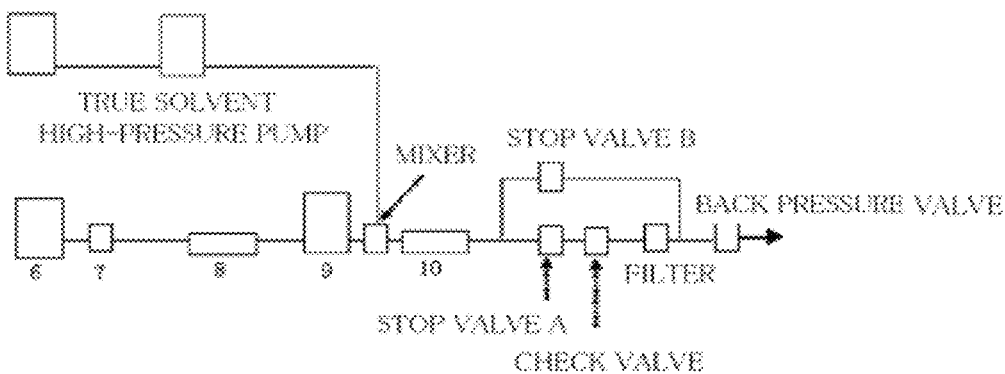
FIG. 10 indicates an evaluation system of Example 10 added to a solvent addition unit.

An evaluation system was constructed as shown in FIG. 10 in which a true solvent addition unit was added to the evaluation system of Comparative Example 3, and evaluation was carried out in the same manner while changing the true solvent addition rate to various rates. Here, a 1/16-inch LDV-T was used as the mixer for the $CO_2$ and true solvent. The results are shown in Table 4.

TABLE 4

| Temperature/pressure | True solvent addition rate (%) Amt. true solvent/Amt. $CO_2$ | Check valve status |
|---|---|---|
| 35° C./8 MPa (supercritical) | 0 | Polymer deposition (entire surface) |
| 35° C./8 MPa (supercritical) | 10 | Polymer deposition (filter surface only) |
| 35° C./8 MPa (supercritical) | 20 | Hardly any polymer deposition |
| 35° C./8 MPa (supercritical) | 30 | No polymer deposition |

As a result of adding 20% or more of true solvent to the $CO_2$ prior to contact between the paint and $CO_2$, extraction of true solvent in the paint filled into the check valve into the $CO_2$ was able to be prevented, and polymer deposition was able to be avoided. Conversely, solubility of the true solvent used in the present example in supercritical $CO_2$ was determined to be roughly 20%.

Example 11

Figure 11:
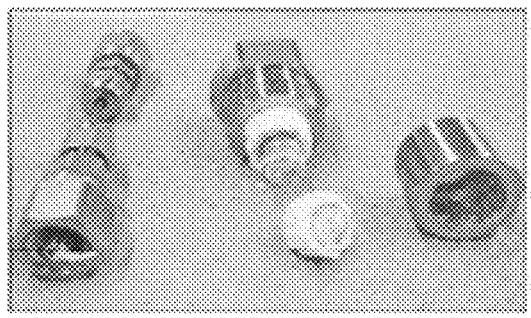
FIG. 11 indicates results in the case of $CO_2$ only in Example 11.
Figure 11:
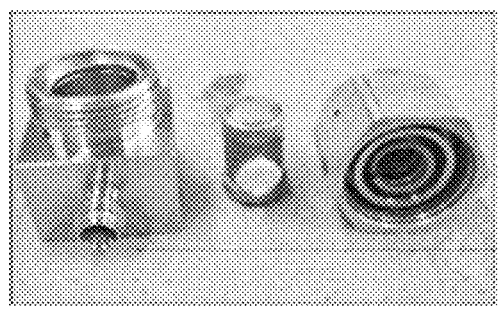
Figure 12:
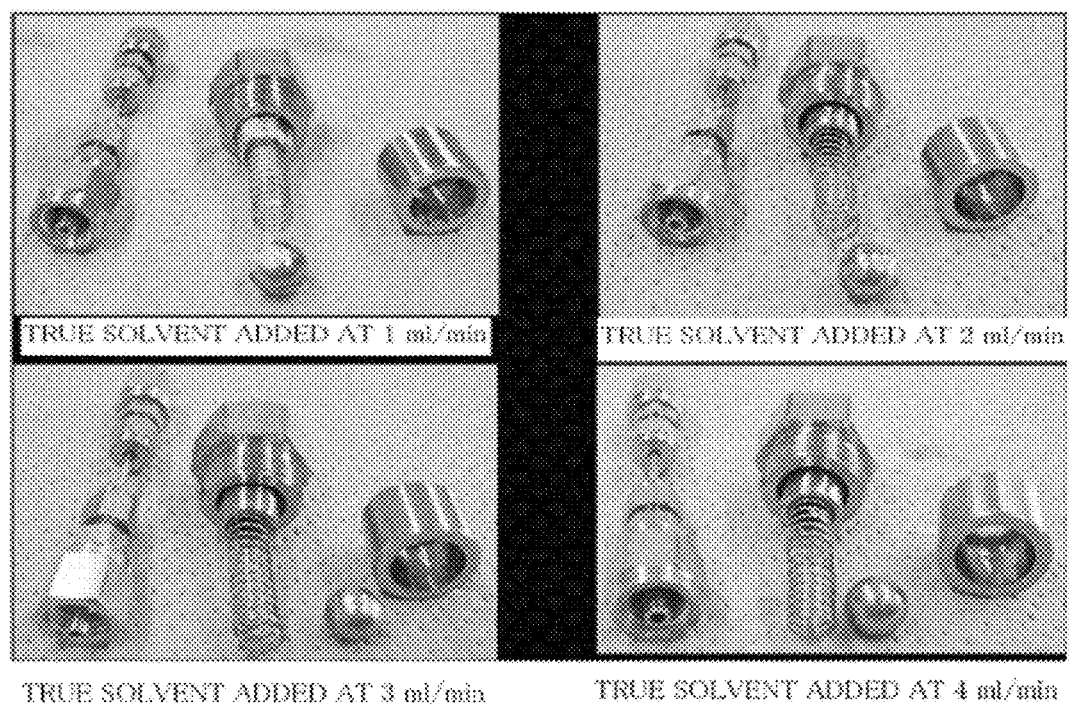
FIG. 12 indicates the effect of adding a true solvent in an example.
Figure 13:
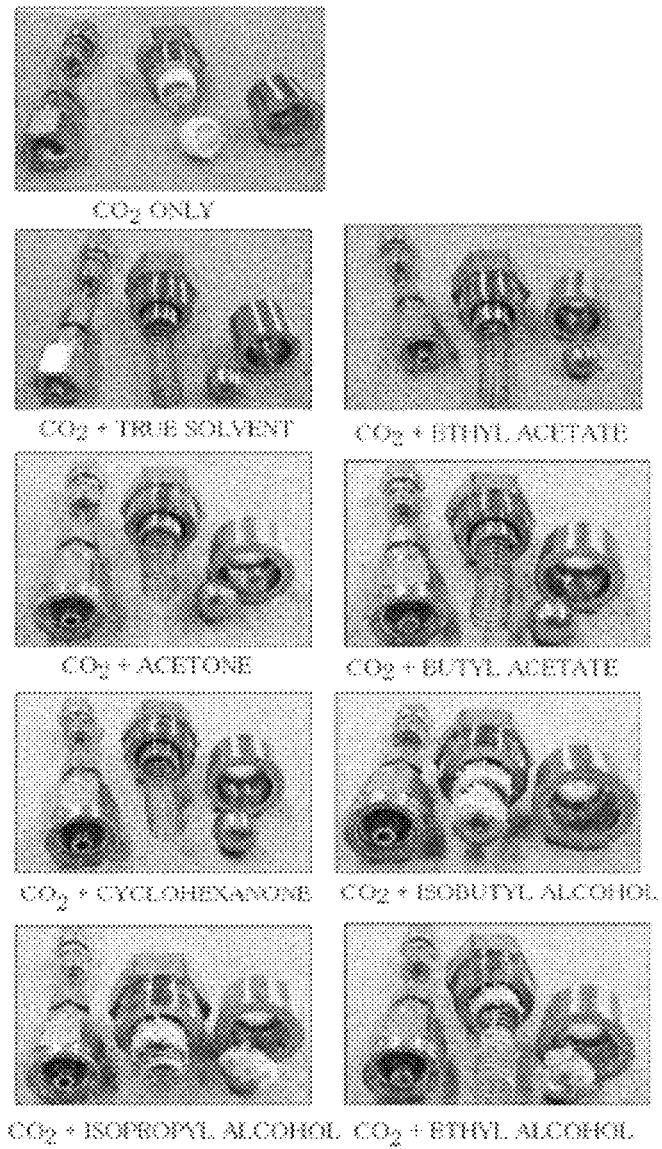
FIG. 13 indicates the effect of adding an organic solvent in Example 11 (when adding at 3 ml/min)

A study similar to that of Example 10 was carried out using various types of organic solvents added to the $CO_2$. The organic solvents used consisted of true solvent as well as true solvent components in the form of ethyl acetate, butyl acetate, cyclohexanone, isobutyl alcohol, and non-true solvent components in the form of acetone, isopropyl alcohol and ethyl alcohol. The evaluation results are summarized in Tables 5 and 6 and shown in FIGS. 11 to 13.

The $CO_2$ conditions in the present example consisted of 40° C. and 80 MPa (supercritical), and the $CO_2$ was supplied at a flow rate of 10 g/min in all cases. In the tables, the degree of deposition was evaluated to one of five levels, ranging from 1: no deposition (optimum state) to 5: large amount of deposition. In addition, phase status indicates the status determined by direct observation of the $CO_2$/organic solvent mixture through an observation window provided in the evaluation line. The number 1 indicates a supercritical single-phase state, while the number 2 indicates a two-phase state.

TABLE 5

| Conditions | Degree of deposition | Check valve | Filter | Phase status | Comments |
|---|---|---|---|---|---|
| $CO_2$ only | 5 | Considerable deposition, whitening | Whitening, clumps | 1 | Large amount of whitening |
| $CO_2$ + true solvent 1 (ml/min) | 3 | Deposits, partial whitening | Whitening, clumps | 1 | Considerable improvement over (1) |
| $CO_2$ + true solvent 2 (ml/min) | 2 | Sticky | Clumps | 1 | Sticky |
| $CO_2$ + true solvent 3 (ml/min) | 1 | Sticky | Clumps | 2 | Degree of deposition lower than (3) |
| $CO_2$ + true solvent 4 (ml/min) | 1 | Sticky | Clumps | 2 | Hardly any deposition in check valve, small amount of deposition in filter |
| $CO_2$ + ethyl acetate 1 (ml/min) | 4 | Considerable deposition, partial whitening | Some clumps | 1 | Ethyl acetate contained at 10% to 20% as true solvent component, considerably worse than addition of equal amount of true solvent |
| $CO_2$ + ethyl acetate 2 (ml/min) | 2 | Sticky | Whitening, clumps | 1 | Somewhat harder than addition of equal amount of true solvent |
| $CO_2$ + ethyl acetate 3 (ml/min) | 2 | Sticky | Some clumps | 2 | Somewhat harder than addition of equal amount of true solvent |

TABLE 5-continued

| Conditions | Degree of deposition | Check valve | Filter | Phase status | Comments |
|---|---|---|---|---|---|
| $CO_2$ + ethyl acetate 4 (ml/min) | 2 | Sticky | Some clumps | 2 | Somewhat harder than addition of equal amount of true solvent |
| $CO_2$ + acetone 1 (ml/min) | 4 | Considerable deposition, partial whitening | Some clumps | 1 | Acetone not contained in true solvent, considerably worse than addition of equal amount of true solvent |
| $CO_2$ + acetone 2 (ml/min) | 2 | Sticky | Whitening, clumps | 1 | Somewhat harder than addition of equal amount of true solvent |
| $CO_2$ + acetone 3 (ml/min) | 2 | Sticky | Whitening, clumps | 2 | Somewhat harder than addition of equal amount of true solvent |
| $CO_2$ + acetone 4 (ml/min) | 2 | Sticky | Clumps | 2 | Somewhat harder than addition of equal amount of true solvent |

TABLE 6

| Conditions | Degree of deposition | Check valve | Filter | Phase status | Comments |
|---|---|---|---|---|---|
| $CO_2$ + butyl acetate 1 (ml/min) | 4 | Considerable deposition, partial whitening | Whitening, few clumps | 1 | Butyl acetate contained at 20% to 30% as true solvent component, somewhat more deposition but similar viscosity (hardness) to addition of equal amount of true solvent |
| $CO_2$ + butyl acetate 2 (ml/min) | 3 | Little deposition | Some clumps | 2 | Somewhat more deposition but similar viscosity (hardness) to addition of equal amount of true solvent |
| $CO_2$ + butyl acetate 3 (ml/min) | 2 | Sticky | Some clumps | 2 | Somewhat more deposition but similar viscosity (hardness) to addition of equal amount of true solvent |
| $CO_2$ + butyl acetate 4 (ml/min) | 2 | Sticky | Sticky | 2 | Somewhat more deposition but similar viscosity (hardness) to addition of equal amount of true solvent |
| $CO_2$ + cyclohexanone 1 (ml/min) | 3 | Deposition, partial whitening | Some clumps | 1 | Butyl acetate contained at 20% to 30% as true solvent component, deposition and hardness similar to true solvent |
| $CO_2$ + cyclohexanone 2 (ml/min) | 2 | Sticky | Clumps | 1 | Deposition and hardness similar to true solvent |
| $CO_2$ + cyclohexanone 3 (ml/min) | 1 | Sticky | Clumps | 2 | Deposition and hardness similar to true solvent |
| $CO_2$ + cyclohexanone 4 (ml/min) | 1 | Sticky | Some clumps | 2 | Deposition and hardness similar to true solvent |
| $CO_2$ + isobutyl alcohol 1 (ml/min) | 4 | Considerable whitening and deposition | Whitening, many clumps | Intermediate? | Isobutyl alcohol contained at 10% to 20% as true solvent component, large amount of whitening and deposition in check valve and filter, phase boundary indistinct |
| $CO_2$ + isobutyl alcohol 2 (ml/min) | 4 | Considerable whitening and deposition | Whitening, many clumps | 1 | Large amount of whitening and deposition in check valve and filter |
| $CO_2$ + isobutyl alcohol 3 (ml/min) | 4 | Considerable whitening and deposition | Whitening, many clumps | 1 | Large amount of whitening and deposition in check valve and filter |
| $CO_2$ + isobutyl alcohol 4 (ml/min) | 4 | Considerable whitening and deposition | Whitening, many clumps | 1 | Large amount of whitening and deposition in check valve and filter |

TABLE 7

| Conditions | Degree of deposition | Check valve | Filter | Phase status | Comments |
|---|---|---|---|---|---|
| $CO_2$ + isopropyl alcohol 1 (ml/min) | 4 | Considerable whitening and deposition | Whitening, clumps | 1 | Isopropyl alcohol not contained in true solvent, whitening and deposition in check valve and filter, and particularly prominent in check valve |
| $CO_2$ + isopropyl alcohol 2 (ml/min) | 4 | Whitening, deposition | Whitening, clumps | 1 | Whitening and deposition in check valve and filter |
| $CO_2$ + isopropyl alcohol 3 (ml/min) | 4 | Considerable whitening and deposition | Whitening, many clumps | 2 | Whitening and deposition in check valve and filter even in two-phase state, particularly prominent in check valve |
| $CO_2$ + isopropyl alcohol 4 (ml/min) | 4 | Considerable whitening and deposition | Whitening, many clumps | 2 | Whitening and deposition in check valve and filter even in two-phase state, particularly prominent in check valve |
| $CO_2$ + ethanol 1 (ml/min) | 4 | Considerable whitening and deposition | Whitening, clumps | 1 | Ethanol not contained in true solvent, whitening and deposition in check valve and filter |
| $CO_2$ + ethanol 2 (ml/min) | 4 | Whitening, deposition | Whitening, many clumps | 1 | Whitening and deposition in check valve and filter |
| $CO_2$ + ethanol 3 (ml/min) | 4 | Considerable whitening and deposition | Whitening, many clumps | 2 | Whitening and deposition in check valve and filter even in two-phase state, prominent clouding, distinct phase boundary |
| $CO_2$ + ethanol 4 (ml/min) | 4 | Considerable whitening and deposition | Whitening, many clumps | 2 | Whitening and deposition in check valve and filter even in two-phase state, prominent clouding, distinct phase boundary |

As is clear from the results shown in the above tables, the most effective prevention of deposition of the polymer contained in a one-liquid curing type paint was demonstrated when the true solvent per se was used for the organic solvent and when cyclohexanone was added at 30% or more based on the amount of $CO_2$, and was followed by the addition of ethyl acetate, butyl acetate and acetone in that order. On the other hand, the addition of alcohol was observed to have hardly any effect regardless of the addition rate.

Example 12

The same experiment as Comparative Example 1 (absence of addition of true solvent) was conducted using various types of mixers. The types of mixers used consisted of STD-T, LDV-T, swirl type (three types of inner diameters of 0.5 mm, 0.8 mm and 10 mm), central collision type (two types consisting of a two-direction type and four-direction type) and double tube style (inner tube: 1/16 inch×inner diameter: 0.5 mm×length 120 mm, and outer tube: 1/4-inch×inner diameter: 4.3 mm×length: 160 mm).

In addition, an experiment was also conducted in which a fluid multi-stage separation-type static mixer was installed downstream from each of the mixers. In this experiment, a configuration was employed in which the paint was sprayed through a 1/8 inch×1000 mm+1/4 inch×1250 mm (bent at 90 degrees at three locations) line after the mixers.

As a result, stability was greatest when the double tube style mixer was used, and this was followed by the central collision types, LDV-T, swirl types and STD-T. The fact that the double tube style mixer demonstrates the simplest fluid flow resulting in smooth flow of the mixture is thought to have led to the favorable outcome. In addition, effects of installing an SM downstream were not observed, while conversely having the effect of reducing stability.

Example 13

Figure 14:
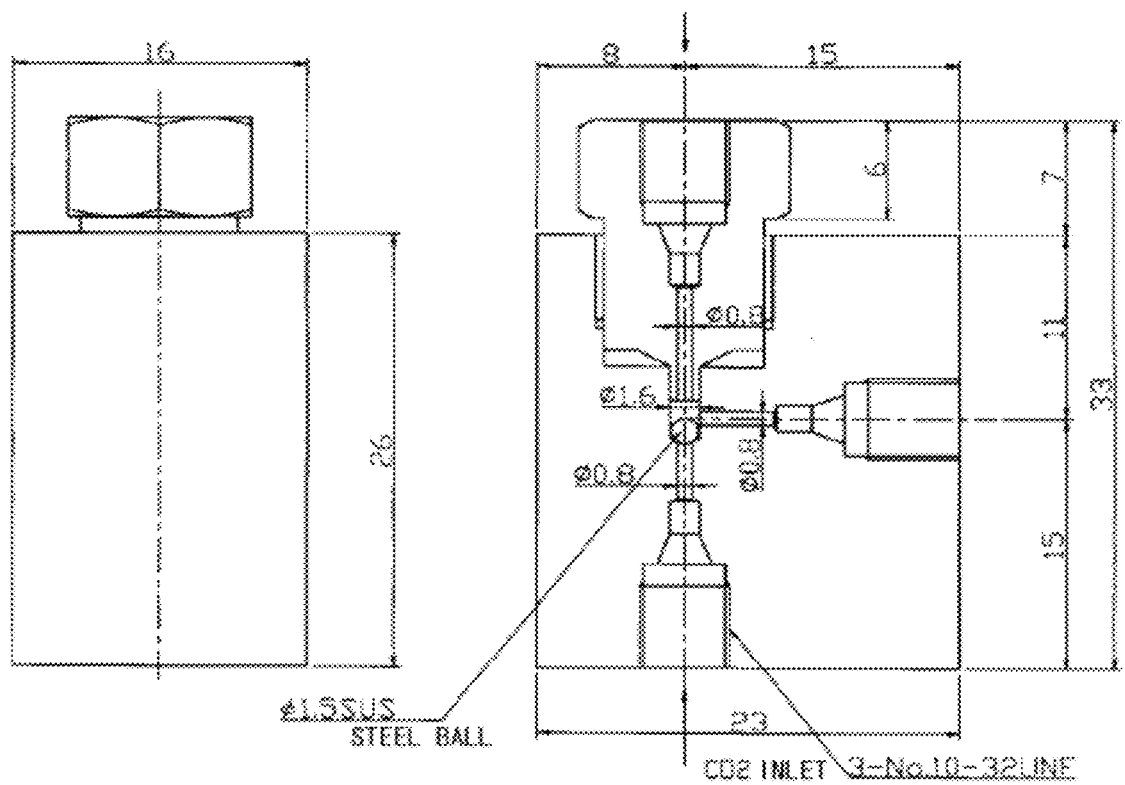
FIG. 14 indicates an overview of a T-shaped mixer provided with a check mechanism.

The same study as Example 11 was conducted using a T-shaped mixer equipped with a check mechanism (see FIG. 14). This mixer contains an internal metal ball, and is used for the purpose of preventing back flow of paint into the $CO_2$ line even if there are fluctuations in pressure. As a result of the experiment, although there were fluctuations in pressure, deposition of polymer in the $CO_2$ line was able to be completely prevented.

Example 14

Coating Experiment

A coating experiment was carried out on a one-liquid curing acrylic clear paint. The paint composition consisted of 28% resin and 72% true solvent. The resin component consisted mainly of acrylic resin and also contained nitrocellulose, while the true solvent was composed of an ester-based solvent, alcohol-based solvent, hydrocarbon-based solvent and ketone-based solvent in that order with the ester-based solvent having the highest content.

The coating procedure consisted of adding the true solvent to the $CO_2$ using the LDV-T, followed by mixing the one-liquid curing type paint with the $CO_2$/true solvent mixture with a double tube style mixer, passing through 1/8-inch×1000 mm+1/4-inch×1250 mm (bent at 90 degrees at three locations) lines, and spraying. The coating procedure was carried out (by a spraying robot) at 40° C. and 8 MPa under conditions of a paint flow rate of 40 g/min, $CO_2$ flow rate of 8 g/min and true solvent flow rate of 2.4 g/min.

As a result, the paint viscosity decreased from 120 cp to 140 cp prior to addition of $CO_2$ to 20 cp or less after addition, there were hardly any fluctuations in pressure, and stable operation over a long period of time was able to be confirmed.

However, although spraying was able to be carried out stably, numerous clumps of paint adhered to the surface of the plastic substrate, thereby preventing the formation of a uniform coated film.

Consequently, the same coating procedure was carried out while adding only the true solvent component to the paint at a weight ratio of 20% to 40% in order to improve leveling. After holding the coated plastic substrate at room temperature for 5 minutes, it was dried for 30 minutes in a dryer at 50° C. to 60° C. to cure the coated film followed by evaluating the coated film surface. As a result, a uniform coated film was formed, the thickness of the coated film was about 20 μm and the surface roughness was 0.5 μm, thereby realizing a practical level of coating.

INDUSTRIAL APPLICABILITY

As has been describe in detail, the present invention relates to a carbon dioxide coating method and a device therefor, and according to the present invention, a novel, low environmental burden type coating device capable of considerably reducing the generation of VOC, and a coating method thereof, can be provided. Moreover, the present invention relates to a coating method for one-liquid or two-liquid paint that uses carbon dioxide, and a device therefor, and according to the present invention, a novel, one-liquid or two-liquid paint coating technology that uses carbon dioxide can be provided that prevents discharge of a diluent solvent (VOC) into the atmosphere. In the present invention, a minimal amount of carbon dioxide can be substituted for the diluent solvent (VOC) used in large amounts in conventional spray coating with an organic solvent-based coating material, and the present invention is able to provide a novel coating technology that prevents discharge of diluent solvent (VOC) into the atmosphere. According to the present invention, a practically applicable coating technology can be provided that is able to reliably inhibit the problem of blockage in a device caused by high viscosity of the paint. The present invention is useful in providing a novel, low environmental burden type coating method that prevents discharge of VOC into the atmosphere, and a device therefor.

The invention claimed is:

1. A coating device, comprising:
   a paint supply line comprising a first tank which stores paint, a paint high-pressure pump which pressurizes a paint supplied from the tank to a prescribed pressure, and a paint primary pressure regulation valve which regulates a discharge pressure of the paint high-pressure pump and returns a paint surplus to the first tank;
   a carbon dioxide supply line comprising a second tank which stores liquid carbon dioxide, a cooler which cools the liquid carbon dioxide to a prescribed temperature, a liquid carbon dioxide high-pressure pump which pressurizes the liquid carbon dioxide supplied from the cooler to a prescribed pressure, and a liquid carbon dioxide primary pressure regulation valve which regulates a discharge pressure of the liquid carbon dioxide high-pressure pump and returns a carbon dioxide surplus to a suction of the liquid carbon dioxide high-pressure pump; and
   a paint/carbon dioxide mixture line comprising a mixer which mixes a pressurized paint supplied from the paint supply line and pressurized carbon dioxide supplied from the carbon dioxide supply line, and a spray gun which sprays a mixed paint/carbon dioxide pressurized mixture supplied from the mixer onto an object at atmospheric pressure,
   wherein the coating device employs carbon dioxide as a substitute for all or a portion of a diluent solvent (thinner) in an organic solvent-based spray coating.

2. The coating device of claim 1, further comprising a paint heater that heats the pressurized paint to a prescribed temperature.

3. The coating device of claim 1, further comprising a second cooler that cools the carbon dioxide surplus returned to the suction of the liquid carbon dioxide high-pressure pump to a prescribed temperature.

4. The coating device of claim 1, further comprising a carbon dioxide heater that heats the pressurized liquid carbon dioxide to a prescribed temperature.

5. The coating device of claim 1, further comprising a mixture heater that heats the mixed paint/carbon dioxide pressurized mixture to a prescribed temperature.

6. The coating device of claim 1, wherein the mixer is a micro mixer capable of rapidly mixing paint and carbon dioxide.

7. The coating device of claim 6, wherein the micro mixer is a T-shaped micro mixer having a flow path diameter of no more than 0.5 mm.

8. The coating device of claim 6, wherein the micro mixer is a central collision micro mixer that causes a fluid to collide in a center of a minute space, allows the carbon dioxide to flow in from an upper portion, and divides the paint into a plurality of flows so as to collide at a central portion from a plurality of directions from a side face of the micro mixer.

9. The coating device of claim 6, further comprising a static mixer in a latter stage of the micro mixer.

10. The coating device of claim 1, wherein the mixed paint/carbon dioxide pressurized mixture is a single-phase mixture wherein carbon dioxide is dissolved in the paint.

11. The coating device of claim 1, wherein the paint is an ultraviolet curing paint, a one-liquid curing paint or a two-liquid curing paint.

12. A method for coating employing the coating device of claim 1, the method comprising:
   setting a first primary pressure regulation valve on the discharge side of the paint high-pressure pump or the carbon dioxide high-pressure pump that controls spraying to a spraying pressure, and setting a second primary pressure regulation valve on the discharge side of the paint high-pressure pump or the carbon dioxide high-pressure pump that does not control spraying pressure to a pressure higher than the spraying pressure, to make the flow rate of a first fluid not controlling the spraying pressure constant;
   varying the flow rate of a second fluid controlling the spraying pressure according to a flow rate characteristic of a spray nozzle orifice; and
   returning a fluid surplus to the pump suction.

13. The coating method of claim 12, wherein the second fluid controlling the spraying pressure is paint.

14. A method for coating employing the coating device of claim 1, the method comprising:
   setting the liquid carbon dioxide primary pressure regulation valve and the paint primary pressure regulation valve on the discharge side of each high-pressure pump to a pressure higher than a spraying pressure;
   spraying an entire amount of a fluid discharged from each high-pressure pump; and
   adjusting the spraying pressure dependent on a flow rate characteristic of a nozzle orifice of the spray gun.

15. The coating method of claim 12, further comprising:
setting a residence time from the mixer to the spray gun of at least 15 seconds, to obtain a stable single-phase mixture.

16. The coating method of claim 12, further comprising:
closing the paint/carbon dioxide mixture line either during or at completion of coating, to discharge the paint within the spray gun outside the spray gun; and
supplying carbon dioxide between a check valve and the spray gun either immediately after the closing or simultaneously to the closing.

17. A coating device, comprising:
a paint supply line comprising a first tank which stores paint, a paint high-pressure pump which pressurizes a paint supplied from the tank to a prescribed pressure, and a paint primary pressure regulation valve which regulates a discharge pressure of the paint high-pressure pump and returns a paint surplus to the paint tank;
a carbon dioxide supply line comprising a second tank which stores liquid carbon dioxide, a cooler which cools the liquid carbon dioxide to a prescribed temperature, a liquid carbon dioxide high-pressure pump which pressurizes the liquid carbon dioxide supplied from the cooler to a prescribed pressure, and a liquid carbon dioxide primary pressure regulation valve which regulates a discharge pressure of the liquid carbon dioxide high-pressure pump and returns a carbon dioxide surplus to a suction of the liquid carbon dioxide high-pressure pump;
a solvent supply line comprising a solvent tank and a solvent high-pressure pump which pressurizes a solvent supplied from the solvent tank to a prescribed pressure; and
a paint/carbon dioxide mixture line comprising a mixer which mixes a pressurized paint supplied from the paint supply line and pressurized carbon dioxide supplied from the carbon dioxide supply line, and a spray gun which sprays a mixed paint/carbon dioxide pressurized mixture supplied from the mixer onto an object at atmospheric pressure,
wherein an organic solvent is preliminarily added to the carbon dioxide prior to mixing with the paint, and
wherein the coating device employs carbon dioxide as a substitute for all or a portion of a diluent solvent (thinner) used in an organic solvent-based spray coating.

18. The coating device of claim 17, wherein the paint is a one-liquid curing paint or a two-liquid curing paint.

19. The coating device of claim 17, wherein the organic solvent is a true solvent of a one-liquid curing paint or a two-liquid curing paint.

20. The coating device of claim 17, wherein a suction portion of the liquid carbon dioxide high-pressure pump comprises the organic solvent.

21. The coating device of claim 17, wherein a delivery portion (pressurized side) of the liquid carbon dioxide high-pressure pump comprises the organic solvent.

22. The coating device of claim 17, further comprising a liquid carbon dioxide heater, wherein a line after the liquid carbon dioxide heater comprises the organic solvent.

23. The coating device of claim 17, wherein the mixer is a micro mixer that mixes the organic solvent and carbon dioxide.

24. The coating device of claim 23, wherein the micro mixer is a double tube micro mixer comprising an inner tube and an outer tube,
wherein an inner diameter of the inner tube through which carbon dioxide enters is no larger than 0.5 mm and an inner diameter of the outer tube is within a range of 2.5 mm to 5 mm.

25. The coating device of claim 17, further comprising a check valve at a location as close as possible to a connection between the carbon dioxide supply line and the mixer, wherein the check valve has a structure that prevents backflow of the paint into the carbon dioxide supply line.

26. The coating device of claim 17, wherein the mixer is a T-shaped micro mixer,
wherein the T-shaped micro mixer has a flow path diameter of no more than 2 mm, comprises a structure that allows carbon dioxide to flow in from a lower portion and the paint to flow in from an upper portion so as to be mutually opposed and allows the mixture to be discharged from a side at 90 degrees, comprises a metal ball inside which prevents backflow, and comprises a structure that prevents a backflow of the paint into the carbon dioxide line.

27. The coating device of claim 17, wherein the mixer is a T-shaped micro mixer,
wherein the T-shaped micro mixer has a flow path diameter of no more than 2 mm, comprises a structure that allows carbon dioxide to flow in from a lower portion and the paint to flow in from a side at 90 degrees and allows the mixture to be discharged upward, comprises a metal ball inside which prevents backflow, and comprises a structure that prevents backflow of the paint into the carbon dioxide line.

28. A method for coating a one-liquid or two-liquid paint employing the coating device of claim 17, the method comprising:
preliminarily adding, to the carbon dioxide, a true solvent of the paint in at least an amount required for saturated solubility to lower the dissolving power of carbon dioxide with respect to the true solvent component, thereby preventing deposition of a polymer comprised in a paint that entered as a result of backflow.

29. The coating method of claim 28, wherein the true solvent is added within a range of 20% to 50% per weight of carbon dioxide.

30. The coating method of claim 27, wherein the paint is a one-liquid curing paint or a two-liquid curing paint.

* * * * *